(12) United States Patent
Hara

(10) Patent No.: US 9,872,235 B2
(45) Date of Patent: Jan. 16, 2018

(54) MOBILE COMMUNICATION DEVICE AND WIRELESS COMMUNICATION METHOD

(71) Applicant: FUJITSU LIMITED, Kawasaki-shi, Kanagawa (JP)

(72) Inventor: Yasushi Hara, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 14/790,160

(22) Filed: Jul. 2, 2015

(65) Prior Publication Data
US 2016/0066205 A1 Mar. 3, 2016

(30) Foreign Application Priority Data
Aug. 27, 2014 (JP) ................................ 2014-172298

(51) Int. Cl.
| H04W 24/10 | (2009.01) |
| H04W 48/16 | (2009.01) |
| H04W 88/08 | (2009.01) |
| H04W 48/20 | (2009.01) |

(52) U.S. Cl.
CPC ............ *H04W 48/16* (2013.01); *H04W 48/20* (2013.01); *H04W 88/08* (2013.01)

(58) Field of Classification Search
CPC .............................. H04W 24/10; H04W 88/08
See application file for complete search history.

(56) References Cited

U.S. PATENT DOCUMENTS

| 8,897,152 B1 * | 11/2014 | Caceres ................ H04W 36/30 370/252 |
| 2004/0192221 A1 | 9/2004 | Matsunaga |
| 2007/0091864 A1 | 4/2007 | Honjo et al. |
| 2007/0127380 A1 * | 6/2007 | Abraham ............ H04L 12/5695 370/235 |
| 2008/0194219 A1 * | 8/2008 | Castaneda ............. H03D 3/002 455/193.1 |
| 2014/0092755 A1 * | 4/2014 | van de Ven ........... H04W 48/20 370/252 |

FOREIGN PATENT DOCUMENTS

| JP | 11-205342 | 7/1999 |
| JP | 2004-304399 | 10/2004 |
| JP | 2007-110373 | 4/2007 |
| JP | 2008-153821 | 7/2008 |
| WO | 2007/066577 | 6/2007 |

\* cited by examiner

*Primary Examiner* — Charles C Jiang
*Assistant Examiner* — Thad Defauw
(74) *Attorney, Agent, or Firm* — Fujitsu Patent Center

(57) ABSTRACT

A wireless communication interface measures a signal level of a received signal from an access point. A control unit calculates connection time with the access point to which a mobile communication device is connected. The control unit associates a first connection threshold or a second connection threshold that is larger than the first connection threshold with the access point on the basis of the connection time. After calculating the connection time, when the mobile communication device is not connected to the access point, the control unit determines whether to connect the mobile communication device to the access point on the basis of a comparison between the signal level and the first connection threshold or the second connection threshold associated with the access point.

6 Claims, 19 Drawing Sheets

FIG. 8

| THRESHOLD TABLE | | 113 |
|---|---|---|
| THRESHOLD NAME | RSSI | |
| HOME AP CONNECTION | RSSI_00 (Th11) | |
| PUBLIC AP CONNECTION | RSSI_20 (Th12) | |

STORAGE UNIT — 110

FIG. 14

| STROAGE UNIT | | 110 |
|---|---|---|

PUBLIC AP TABLE — 114

| BSSID | INDIVIDUAL CONNECTION THRESHOLD |
|---|---|
| BSSID_03 | RSSI_20 |
| BSSID_04 | RSSI_15 |

MOBILE COMMUNICATION DEVICE AND WIRELESS COMMUNICATION METHOD

CROSS-REFERENCE TO RELATED APPLICATION

This application is based upon and claims the benefit of priority of the prior Japanese Patent Application No. 2014-172298, filed on Aug. 27, 2014, the entire contents of which are incorporated herein by reference.

FIELD

The embodiments discussed herein relate to a mobile communication device and a wireless communication method.

BACKGROUND

Nowadays, mobile communication devices capable of connecting to wireless local area networks (LANs) are used. Access points (also referred to as base stations) equipped with wireless interfaces are provided at various locations in a wireless LAN. For example, a mobile communication device searches for available access points located in the surrounding area (this operation will alternatively be referred to as scanning, as needed). If the mobile communication device detects that an access point satisfies a predetermined condition and that the signal level received from the access point is above a connection threshold, the mobile communication device connects to the access point automatically or in accordance with an instruction from the user, so as to perform wireless communication through the access point.

In one proposed access point selection method, home networks that a mobile communication device use most frequently are distinguished from remote networks that the mobile communication device use while away from the home networks. In such selection method, domain IDs of the home networks are stored in the mobile communication device in advance. Among the access points satisfying predetermined quality, the mobile communication device preferentially selects an access point having a home network domain ID. If none of the access points have a home network domain ID, the mobile communication device is allowed to connect to an access point having a different domain ID.

In addition, as a method for determining whether to allow a mobile communication device to connect to an access point, a handover method has been proposed. In this method, a mobile communication device automatically starts connecting to a wireless system, depending on its wireless link quality. In the handover method, a user presets a connection priority level that is associated with a system identifier of the wireless system. In addition, a connection threshold having a negative correlation with the connection priority level is calculated and associated with the system identifier. When the mobile communication device detects a wireless system, if the wireless link quality of the wireless system is above a connection threshold that corresponds to the system identifier of the wireless system, the mobile communication device automatically connects to the wireless system. The smaller the connection threshold associated with the wireless system is, the more easily the mobile communication device is connected to the wireless system. In addition, the larger the connection threshold associated with the wireless system is, the less easily the mobile communication device is connected to the wireless system.

See, for example, the following documents:
Japanese Laid-open Patent Publication No. 11-205342
Japanese Laid-open Patent Publication No. 2004-304399

As described above, there is a mobile communication device that automatically connects to an access point if the mobile communication device determines that the access point satisfies a predetermined condition and that the signal level received from the access point is above a connection threshold. In addition, in recent years, many facilities such as shops have provided access points in their establishments. Therefore, many access points are found throughout a town. As a result, while a user is travelling in town, the user's mobile communication device could repeatedly be connected to and disconnected from various access points. Such repetition is considered to be a problem. By repeatedly being connected to and disconnected from access points, power consumption of the mobile communication device could be increased. In addition, wireless communication using another wireless system such as a mobile phone network could be affected (for example, wireless communication may be disconnected).

It is also desirable that connection to an access point located at a user's home or office be promptly established and not easily disconnected so that stable wireless communication is achieved. To address the above issues, there is a method in which a user sets a connection priority level to each access point and applies a different connection threshold per access point. According to this method, an access point located at a user's home or office is easily connected by setting a higher priority level (setting a lower connection threshold), and access points located in town are less easily connected by setting lower priority levels (setting higher connection thresholds).

However, if the user needs to set a connection priority level for each access point, much burden is placed on the user in setting operations. This is considered to be a problem.

SUMMARY

According to one aspect, there is provided a mobile communication device including: a wireless communication interface configured to measure a signal level of a received signal from an access point; and a processor configured to perform a procedure including: calculating connection time with the access point to which the mobile communication device is connected, associating, on the basis of the connection time, a first connection threshold or a second connection threshold that is larger than the first connection threshold with the access point, and determining, after calculating the connection time, when the mobile communication device is not connected to the access point, whether to connect the mobile communication device to the access point on the basis of a comparison between the signal level and the first connection threshold or the second connection threshold associated with the access point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an exemplary threshold table;

FIG. 14 illustrates an exemplary public AP table;

DESCRIPTION OF EMBODIMENTS

Figure 1:
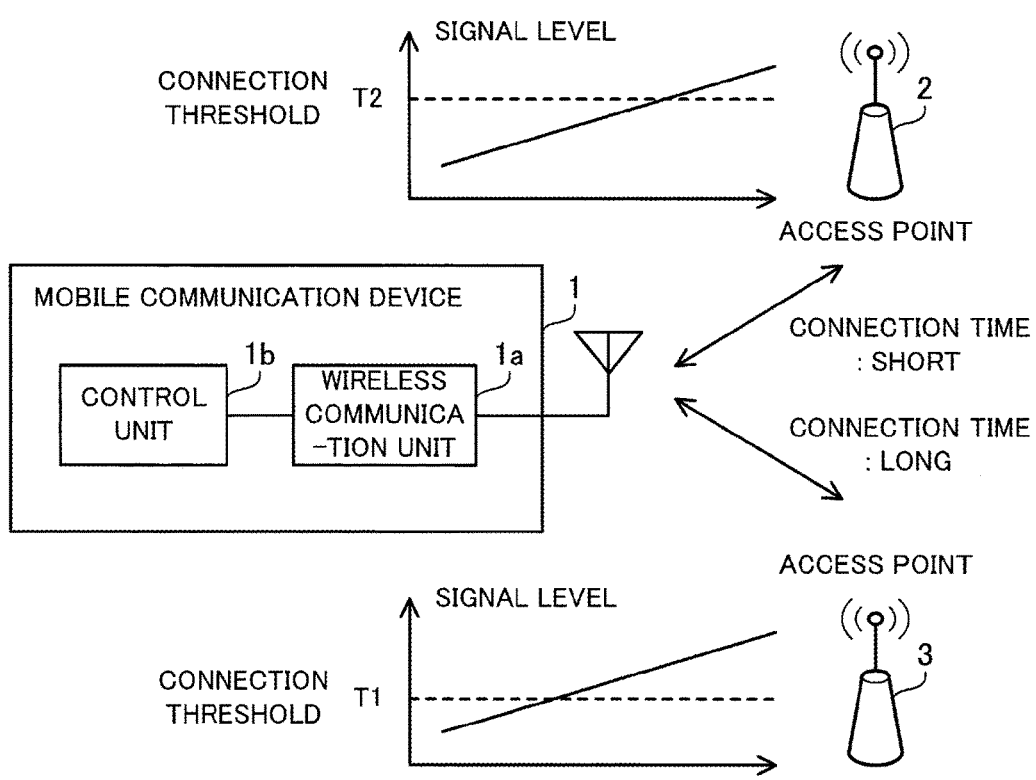
FIG. 1 illustrates a mobile communication device according to a first embodiment.

Several embodiments will be described below with reference to the accompanying drawings, wherein like reference numerals refer to like elements throughout.

First Embodiment

FIG. 1 illustrates a mobile communication device according to a first embodiment.

A mobile communication device 1 according to the first embodiment is capable of performing wireless communication by connecting to an access point 2 or 3. For example, the mobile communication device 1 is a mobile wireless terminal device such as a mobile phone, a smartphone, a personal digital assistant (PDA), or a tablet terminal. For example, the access points 2 and 3 are wireless communication devices that belong to a wireless LAN. The access points 2 and 3 may be referred to as base stations. Each of the access points 2 and 3 includes a wireless interface for performing wireless communication with the mobile communication device 1 and a wired interface or another wireless interface for communicating with a higher-level network. Each of the access points 2 and 3 relays data from the mobile communication device 1.

The mobile communication device 1 includes a wireless communication unit 1a and a control unit 1b.

The wireless communication unit 1a is a wireless interface that enables wireless communication with the access points 2 and 3. When the mobile communication device 1 is not connected to any access point, the wireless communication unit 1a searches for an access point that exists around the mobile communication device 1. This operation of searching for an access point may be referred to as scanning. In addition, the wireless communication unit 1a measures signal levels of received signals from the detected access point. For example, such a signal level is represented by using an index value such as a received signal strength indicator (RSSI).

The control unit 1b controls connection to the access point 2 or 3 by using the wireless communication unit 1a. The control unit 1b may include a processor such as a central processing unit (CPU) or a digital signal processor (DSP). In addition, the control unit 1b may include an application-specific electronic circuit such as an application specific integrated circuit (ASIC) or a field programmable gate array (FGPA). For example, the processor executes a communication control program stored in a storage device such as a random access memory (RAM) or a flash memory. A group of a plurality of processors (a multiprocessor) may be referred to as a processor.

When the mobile communication device 1 is connected to the access point 2, the control unit 1b calculates connection time. The connection time may be a duration of time of a single connection to the access point 2 from its establishment to disconnection. Alternatively, the connection time may be an accumulated time of connections to the access point 2 without switching the connection to another access point. In the latter case, even if the mobile communication device 1 is temporarily disconnected from the access point 2, the connection time is not reset. Likewise, when the mobile communication device 1 is connected to the access point 3, the control unit 1b calculates connection time with the access point 3.

After calculating connection time with the access point 2, the control unit 1b associates a connection threshold T1 (a first connection threshold) or a connection threshold T2 (a second connection threshold) with the access point 2 on the basis of the calculated connection time. The connection thresholds T1 and T2 are signal level thresholds, and the connection threshold T2 is larger than the connection threshold T1. For example, if the connection time is above a predetermined time threshold (namely, if the connection time is long), the control unit 1b associates the connection threshold T1 (namely, the smaller connection threshold of the two) with the access point 2. In contrast, for example, if the connection time is equal to or less than the predetermined time threshold (namely, when the connection time is short), the control unit 1b associates the connection threshold T2 (namely, the larger connection threshold of the two) with the access point 2.

Likewise, after calculating connection time with the access point 3, the control unit 1b associates the connection threshold T1 or the connection threshold T2 with the access point 3 on the basis of the calculated connection time. The control unit 1b may associate the connection threshold T1 or T2 with the access points 2 or 3 immediately after calculating corresponding connection time or when the access point 2 or 3 is detected next time (if there is a possibility of reconnection to the access point 2 or 3).

After the control unit 1b calculates the connection time with the access point 2, if the access point 2 is detected by scanning while the mobile communication device 1 is not connected to any of the access points, the control unit 1b determines whether to reconnect the mobile communication device 1 to the access point 2. To determine whether to allow the reconnection, the control unit 1b compares the signal level of a received signal from the access point 2 with the connection threshold (the connection threshold T1 or T2) associated with the access point 2. For example, if the signal level is above the connection threshold, the control unit 1b allows connection to the access point 2. Likewise, after the control unit 1b calculates the connection time with the access point 3, if the access point 3 is detected by scanning while the mobile communication device 1 is not connected to any of the access points, the control unit 1b determines whether to reconnect the mobile communication device 1 to the access point 3 by using the connection threshold associated with the access point 3.

Next, a case in which the mobile communication device 1 has short connection time with the access point 2 and long connection time with the access point 3 will be described.

It is likely that the access point 2 with which the mobile communication device 1 has short connection time is an access point that is located in a shop or the like in town and that is not used by the user frequently. If the control unit 1b associates the connection threshold T2 with the access point 2, the mobile communication device 1 is not connected to the access point 2 unless the mobile communication device 1 is brought close enough to the access point 2. Namely, it is fair to say that connection to the access point 2 is not easily established. Therefore, by associating the connection threshold T2 with the access point 2 with which the mobile communicating device 1 has short connection time, it is expected that the mobile communication device 1 is not easily connected to the access point 2 that is located at a place where the user merely passes by while travelling.

In contrast, it is likely that the access point 3 with which the mobile communication device 1 has long connection time is an access point that is located at the user's home or office or the like and that is used by the user frequently. If the control unit 1b associates the connection threshold T1 with the access point 3, the mobile communication device 1 is connected to the access point 3 even if the mobile communication device 1 is relatively distant from the access point 3. Namely, it is fair to say that connection to the access point 3 is easily established. Therefore, by associating the connection threshold T1 with the access point 3 with which the mobile communication device 1 has long connection time, it is expected that the mobile communication device 1 is easily connected to the frequently-used access point 3 located at the user's home or office or the like.

The mobile communication device 1 according to the first embodiment calculates connection time with each of the access points 2 and 3, and different connection thresholds are associated with the access points 2 and 3, respectively, on the basis of the calculated connection time. For example, the connection threshold T1 is associated with the access point 3, and the connection threshold T2, which is larger than the connection threshold T1, is associated with the access point 2.

In this way, even if the mobile communication device 1 accidentally detects the access point 2 while the user is travelling, an unintended connection to the access point 2 against the user's will is prevented. In addition, at the user's home or office or the like, the mobile communication device 1 promptly connects to the access point 3 and performs stable wireless communication. In addition, since connection thresholds to be associated with the access points 2 and 3 are automatically determined on the basis of corresponding connection time, the user does not need to set a connection threshold for each access point. Thus, the operational burden on the user is reduced.

Second Embodiment

Figure 2:
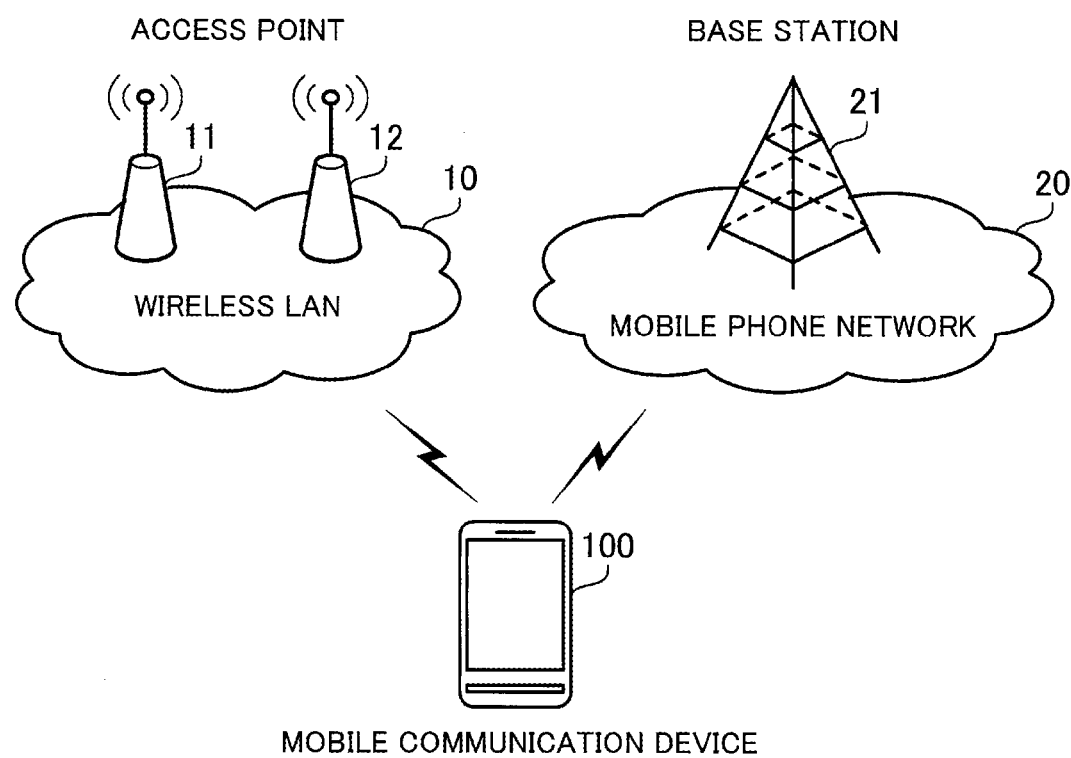
FIG. 2 illustrates a mobile communication system according to a second embodiment.

FIG. 2 illustrates a mobile communication system according to a second embodiment.

The mobile communication system according to the second embodiment includes a wireless LAN 10, a mobile phone network 20, and a mobile communication device 100. The wireless LAN 10 includes a plurality of access points including access points 11 and 12. The mobile phone network 20 includes a plurality of base stations including a base station 21. The mobile communication device 100 is an example of the mobile communication device 1 according to the first embodiment. The access points 11 and 12 are examples of the access points 2 and 3 according to the first embodiment.

The access points 11 and 12 are wireless communication devices that perform wireless communication in accordance with the Institute of Electrical and Electronics Engineers (IEEE) 802.11 series of standards. The access points 11 and 12 may be referred to as base stations. The wireless communication may be performed in accordance with standards compliant with IEEE 802.11g, IEEE 802.11n, and IEEE 802.11ac. The access points 11 and 12 may be compliant with Wireless Fidelity (Wi-Fi). The access points 11 and 12 partially cover parts of the wireless area of the mobile phone network 20. Namely, wireless areas of the wireless LAN 10 are provided in various locations within the wireless area of the mobile phone network 20. Each of the access points 11 and 12 is connected to a wired network and relays data between the mobile communication device 100 and the wired network. For example, each of the access points 11 and 12 is connected to a data communication network in which data communication is performed by using the Internet protocol (IP).

The base station 21 is a wireless communication apparatus that performs wireless communication in accordance with 3rd Generation Partnership Project (3GPP) standards. The wireless communication may be performed in accordance with standards compliant with wideband code division multiple access (W-CDMA), long term evolution (LTE), etc. The base station 21 covers a wide wireless area including the wireless areas of the wireless LAN 10. In other words, the base station 21 forms a macro cell. The base station 21 is connected to a wired network and relays data between the mobile communication device 100 and the wired network. For example, the base station 21 is connected to the same data communication network to which the access points 11 and 12 are connected.

The mobile communication device 100 is a mobile wireless communication device that includes both a wireless interface using the wireless LAN 10 and a wireless interface using the mobile phone network 20. The mobile communication device 100 may be a user terminal device operated by a user, such as a mobile phone, a smartphone, a PDA, or a tablet terminal. The mobile communication device 100 accesses servers that belong to the data communication network via the wireless LAN 10 or the mobile phone network 20 and receives data such as Web pages, still images, and moving images.

For example, the mobile communication device 100 receives data from the data communication network via the base station 21. However, if the mobile communication device 100 enters the wireless area of the access point 11, the mobile communication device 100 is connected to the access point 11 and receives data from the data communication network via the access point 11 instead of the base station 21. Likewise, if the mobile communication device 100 enters the wireless area of the access point 12, the mobile communication device 100 is connected to the access point 12 and receives data from the data communication network via the access point 12 instead of the base station 21. Namely, in principle, when the wireless LAN 10 is available, the mobile communication device 100 preferentially uses the wireless LAN 10.

In addition, a basic service set identifier (BSSID) and an extended service set identifier (ESSID) are given to each of the access points as identification information. A BSSID is represented by a 48-bit value string for physically identifying each individual access point. Normally, a medium access control (MAC) address of an access point is used as its BSSID. An ESSID is represented by data of 32 alphanumeric characters or less for logically identifying an access point or a group of a plurality of access points. For example, the same ESSID could be given to each of a plurality of access points that belong to the same wireless LAN service provided by a certain telecommunications carrier.

Figure 3:
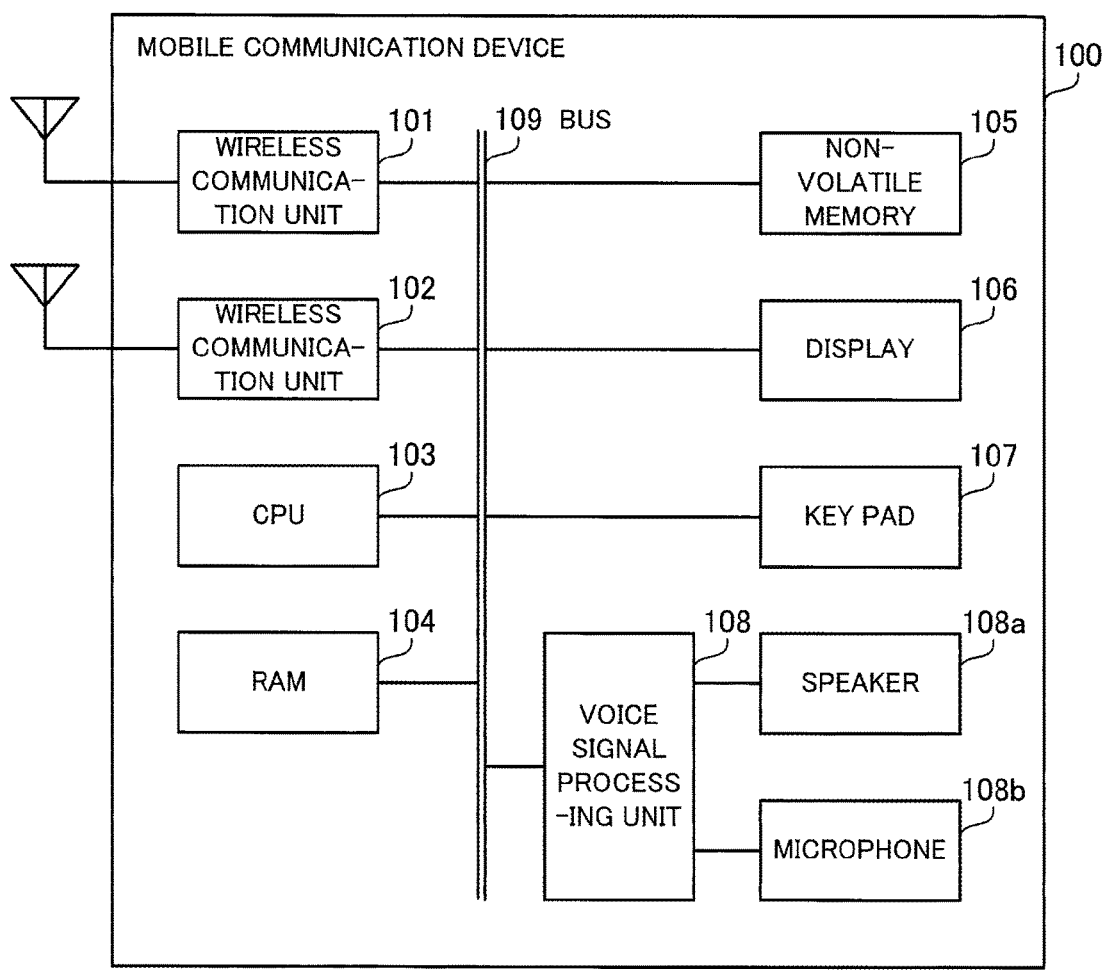
FIG. 3 is a block diagram illustrating an exemplary hardware configuration of the mobile communication device.

FIG. 3 is a block diagram illustrating an exemplary hardware configuration of the mobile communication device 100.

The mobile communication device 100 includes wireless communication units 101 and 102, a CPU 103, a RAM 104, a non-volatile memory 105, a display 106, a key pad 107, a voice signal processing unit 108, a speaker 108a, a microphone 108b, and a bus 109. The wireless communication units 101 and 102, the CPU 103, the RAM 104, the non-volatile memory 105, the display 106, the key pad 107, and the voice signal processing unit 108 are connected to the bus 109. The speaker 108a and the microphone 108b are connected to the voice signal processing unit 108. The wireless communication unit 101 and the CPU 103 are examples of the wireless communication unit 1a and the control unit 1b according to the first embodiment, respectively.

The wireless communication unit 101 is a wireless interface for performing wireless communication in accordance with a communication method used in the wireless LAN 10. In response to an instruction from the CPU 103, the wireless communication unit 101 scans for access points and notifies the CPU 103 of a scan result. In the scanning, the wireless communication unit 101 measures received signal strength of each detected access point. In the second embodiment, an RSSI is used as an index value that represents the received signal strength. A scan result includes a BSSID and an ESSID of each of the detected access points and the measured RSSI. In addition, the wireless communication unit 101 performs processing for connecting the mobile communication device 100 to an access point specified by the CPU 103. This processing enables data communication via the access point.

The wireless communication unit 102 is a wireless interface for performing wireless communication in accordance with a communication method used in the mobile phone network 20. In response to an instruction from the CPU 103, the wireless communication unit 102 connects the mobile communication device 100 to the base station 21 so that data communication via the base station 21 is enabled. When the mobile communication device 100 is not connected to any of the access points included in the wireless LAN 10, the mobile communication device 100 performs data communication by using the wireless communication unit 102. When the mobile communication device 100 is connected to any of the access points included in the wireless LAN 10, the mobile communication device 100 performs data communication by using the wireless communication unit 101.

The CPU 103 is a processor that executes program commands. The CPU 103 loads at least a part of a program or data stored in the non-volatile memory 105 to the RAM 104 and performs processing in accordance with a program. The CPU 103 may include a plurality of processor cores. The mobile communication device 100 may include a plurality of processors. Processing described below may be performed in parallel by using a plurality of processors or processor cores. In addition, a group of processors (a multiprocessor) may be referred to as a processor.

The RAM 104 is a volatile semiconductor memory in which programs executed by the CPU 103 and data referenced by programs are temporarily stored. The mobile communication device 100 may include a different type of memory other than a RAM and may include a plurality of memories.

The non-volatile memory 105 is a non-volatile storage device in which an operating system (OS), middleware, software programs such as application software, and data are stored. The programs include a communication control program for controlling wireless communication performed by the wireless communication unit 101. For example, a flash memory may be used as the non-volatile memory 105. However, the mobile communication device 100 may include another type of storage device such as a hard disk drive (HDD) and may include a plurality of non-volatile storage devices.

In response to an instruction from the CPU 103, a content such as a Web page, a still image, or a moving image and an operation screen are displayed on the display 106. Any type of display such as a liquid crystal display (LCD) and an organic electro-luminescence (OEL) display may be used as the display 106.

The key pad 107 is an input device for receiving inputs from the user. The key pad 107 includes at least one key and outputs an input signal indicating a key pressed by the user to the CPU 103. The mobile communication device 100 may include another input device such a touch panel, instead of or together with the key pad 107. For example, the touch panel is arranged on the display 106. The touch panel detects a touch operation performed on the display 106 and notifies the CPU 103 of a corresponding touch position.

In response to an instruction from the CPU 103, the voice signal processing unit 108 processes a voice signal. The voice signal 108 acquires digital voice data, converts the acquired digital voice data into analog voice signals, and outputs the analog voice signals to the speaker 108a. In addition, the voice signal processing unit 108 acquires analog voice signals from the microphone 108b and converts the acquired analog voice signals into digital voice data.

The speaker 108a acquires electric signals as voice signals from the voice signal processing unit 108 and reproduces sound by converting the electric signals into physical vibrations. For example, while a voice call by the user is in progress, voice of a peer and background noise is reproduced. The microphone 108b converts physical vibrations of sound into electric signals and outputs the electric signals to the voice signal processing unit 108 as voice signals. For example, while a voice call by the user is in progress, voice of the user and background noise is input via the microphone 108b.

If the mobile communication device 100 has detected the access point 11 or 12 by scanning, the mobile communication device 100 determines whether to connect to the detected access point 11 or 12. Next, how the mobile communication device 100 makes this determination will be described. In the second embodiment, the following description will be made assuming that the access point 11 is an access point that is located in a shop in town and that is not used by the user of the mobile communication device 100 frequently. The second embodiment also assumes that the access point 12 is an access point that is located at the user's home or office and that is used by the user frequently. Hereinafter, the former access point and the latter access point may be referred to as a public access point and a home access point, respectively.

Figure 4A:
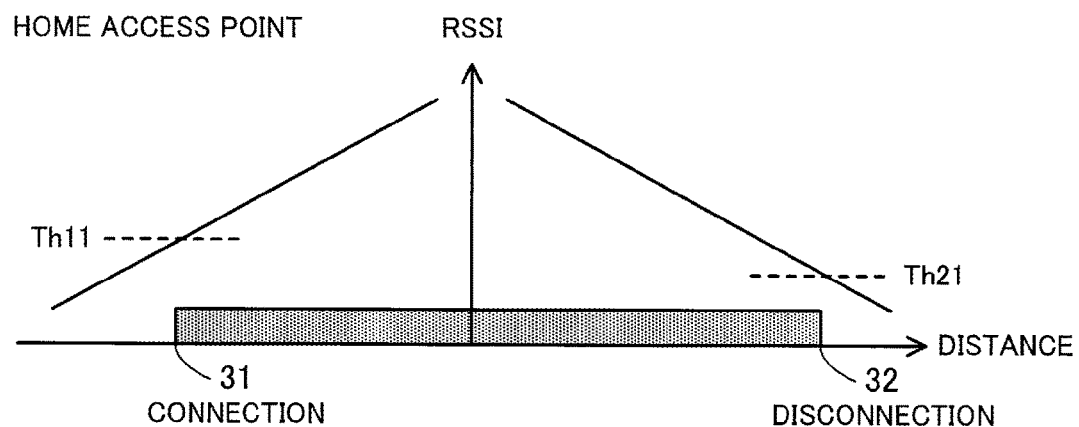
FIGS. 4A and 4B illustrate exemplary connection and disconnection operations performed on access points.
Figure 4B:
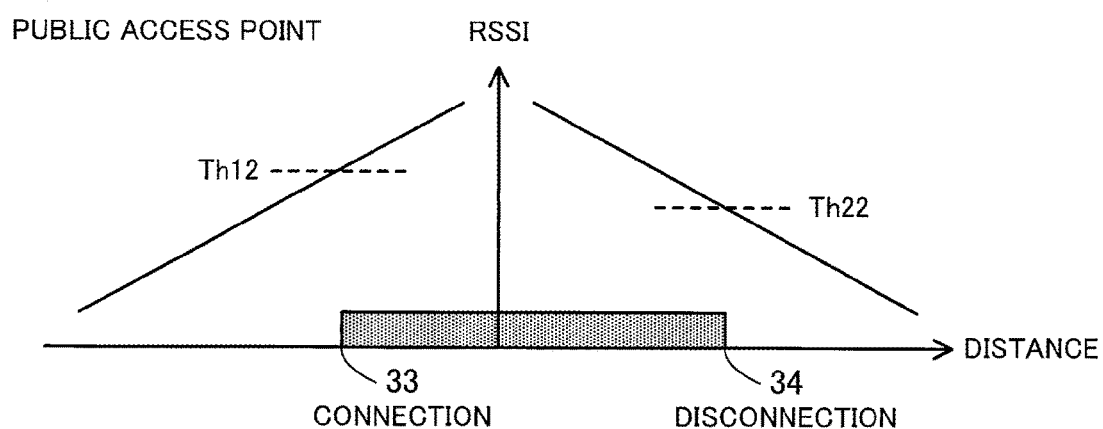

FIGS. 4A and 4B illustrate exemplary connection and disconnection operations performed on the home and public access points.

When an RSSI representing the signal level of a received signal from the access point 12 exceeds a connection threshold Th11, the mobile communication device 100 is connected to the access point 12, which is the home access point. In addition, when the RSSI reaches a disconnection threshold Th21 or less, the mobile communication device 100 is disconnected from the access point 12. The disconnection threshold Th21 is smaller than the connection threshold Th11. As the mobile communication device 100 is brought closer to the access point 12, the RSSI is gradually increased. At a position 31, the mobile communication device 100 is connected to the access point 12. In contrast, as the mobile communication device 100 is brought away from the access point 12, the RSSI is gradually decreased. At a position 32, the mobile communication device 100 is disconnected from the access point 12.

When an RSSI representing the signal level of a received signal from the access point 11 exceeds a connection threshold Th12, the mobile communication device 100 is connected to the access point 11, which is the public access point. In addition, when the RSSI reaches a disconnection threshold Th22 or less, the mobile communication device 100 is disconnected from the access point 11. The disconnection threshold Th22 is smaller than the connection threshold Th12. As the mobile communication device 100 is brought closer to the access point 11, the RSSI is gradually increased. At a position 33, the mobile communication device 100 is connected to the access point 11. In contrast, as the mobile communication device 100 is brought away from the access point 11, the RSSI is gradually decreased. At a position 34, the mobile communication device 100 is disconnected from the access point 11.

The connection threshold Th12 is larger than the connection threshold Th11. Therefore, a distance between the access point 11 and the position 33 is smaller than that between the access point 12 and the position 31. Namely, the mobile communication device 100 is less easily connected to the access point 11, which is the public access point, than to the access point 12, which is the home access point. As a result, even when the mobile communication device 100 accidentally passes by the shop having the access point 11, the possibility that the mobile communication device 100 is connected to the access point 11 is reduced.

In addition, the disconnection threshold Th22 is larger than the disconnection threshold Th21. Therefore, the distance between the access point 11 and the position 34 is smaller than that between the access point 12 and the position 32. Namely, the mobile communication device 100 is more easily disconnected from the access point 11, which is the public access point, than from the access point 12, which is the home access point. As a result, even when the mobile communication device 100 enters the shop and establishes connection with the access point 11, it is likely that the mobile communication device 100 is disconnected from the access point 11 as soon as the mobile communication device 100 leaves the shop.

In addition, for example, the connection threshold Th11 and the disconnection threshold Th21 may be set to −80 dBm and −85 dBm, respectively. The connection threshold Th12 and the disconnection threshold Th22 may be set to −60 dBm and −65 dBm, respectively. For example, such connection thresholds may be determined on the basis of measured data. More specifically, an operator may use a measuring device to measure RSSIs while changing the distance between a target access point and the measuring device. However, since radio waves attenuate when passing through objects such as human bodies, the measured data may be corrected by estimating the population in town, for example. In addition, for example, a disconnection threshold may be set to a value that is smaller than a corresponding connection threshold by a predetermined value (for example, 5 dBm).

According to the second embodiment, the mobile communication device 100 automatically determines whether a certain access point is a home access point or a public access point on the basis of connection time that has been measured with the certain access point. If the mobile communication device 100 determines that the access point is a home access point, the mobile communication device 100 associates the connection threshold Th11 and the disconnection threshold Th21 with the access point. If the mobile communication device 100 determines that the access point is a public access point, the mobile communication device 100 associates the connection threshold Th12 and the disconnection threshold Th22 with the access point.

Figure 5A:
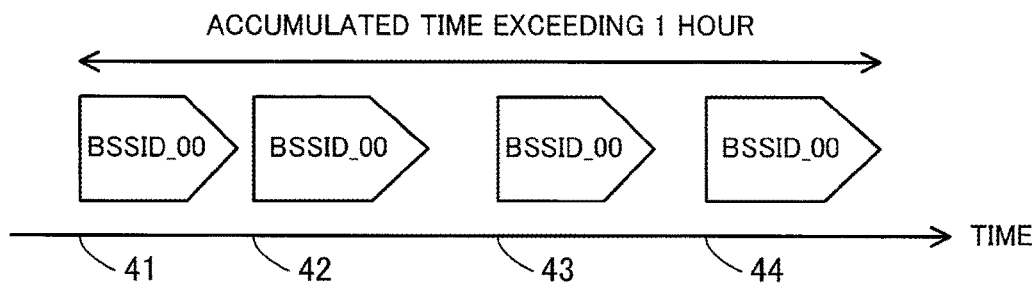
FIGS. 5A and 5B illustrate exemplary connection time measurement operations performed on access points.
Figure 5B:
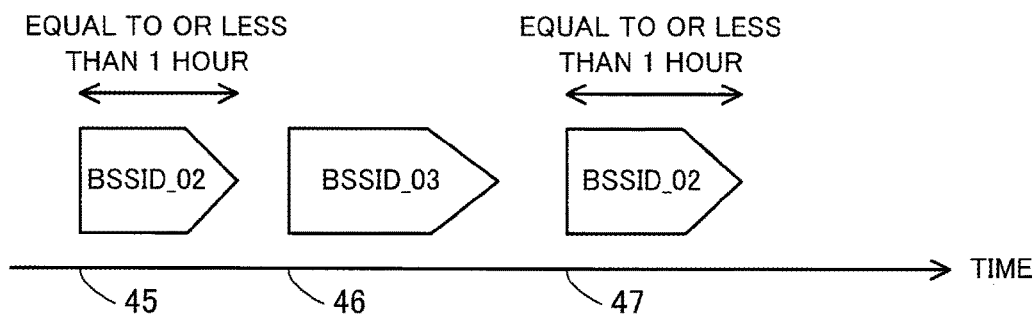

FIGS. 5A and 5B illustrate exemplary connection time measurement operations performed on the access points.

When connected to an access point, the mobile communication device 100 calculates connection time with the access point. The connection time is an accumulated time of connections to the access point without switching to another access point. Namely, even when the connection to the access point is temporarily disconnected, if the mobile communication device 100 is reconnected to the same access point immediately after being disconnected from the access point, the connection time is not reset. However, after being disconnected from the access point, if the mobile communication device 100 is connected to a different access point, the connection time is reset. The mobile communication device 100 determines that an access point with which the mobile communication device 100 has long connection time is a home access point and an access point with which the mobile communication device 100 has short connection time is a public access point.

For example, the following description will be made on the basis of a case in which the mobile communication device 100 is connected to the access point 12 at time 41, next temporarily disconnected, next reconnected to the access point 12 at time 42, next temporarily disconnected, next reconnected to the access point 12 at time 43, next temporarily disconnected, and next reconnected to the access point 12 at time 44. In such case, the measurement of the connection time is not reset at any of the times 42 to 44. If the sum of the four time periods that begin from the times 41 to 44, respectively, (namely, the time periods in which the mobile communication device 100 has sequentially been connected to the access point 12 without switching to another access point) exceeds a predetermined time (for example, one hour), the mobile communication device 100 determines that the access point 12 is a home access point.

In addition, for example, the following description will be made on the basis of a case in which the mobile communication device 100 is connected to the access point 11 at time 45, next temporarily disconnected, next connected to a different access point at time 46, next temporarily disconnected, and next reconnected to the access point 11 at time 47. In such case, the measurement of the connection time is reset at the times 46 and 47. If each of the two time periods that begin from the times 45 and 47, respectively, is equal to or less than the predetermined time (for example, one hour), the mobile communication device 100 determines that the access point 11 is a public access point.

Next, connection control functions of the mobile communication device 100 will be described.

Figure 6:
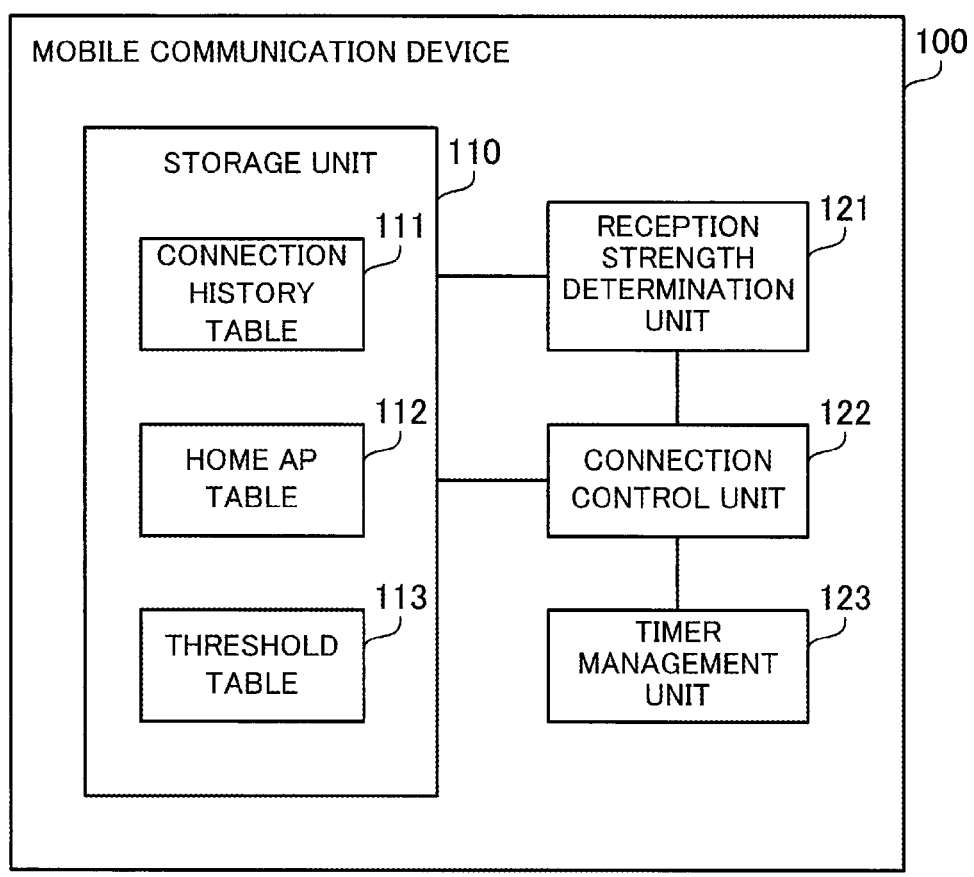
FIG. 6 is a block diagram illustrating an exemplary software configuration of the mobile communication device.

FIG. 6 is a block diagram illustrating an exemplary software configuration of the mobile communication device 100.

The mobile communication device 100 includes a storage unit 110, a reception strength determination unit 121, a connection control unit 122, and a timer management unit 123. For example, the storage unit 110 is realized as a storage area in the RAM 104 or the non-volatile memory 105. For example, the reception strength determination unit 121, the connection control unit 122, and the timer management unit 123 are realized as modules of the communication control program executed by the CPU 103.

The storage unit 110 holds control information used for connection control. The control information includes a connection history table 111, a home AP table 112, and a threshold table 113.

The ESSIDs of access points to which the mobile communication device 100 has previously been connected in accordance with user instructions are registered in the connection history table 111. Without an instruction from the user, the mobile communication device 100 may automatically be connected to an access point whose ESSID is registered in the connection history table 111, namely, to an access point whose type is the same as that of an access point to which the mobile communication device 100 has previously been connected (for example, an access point managed by the same telecommunication carrier). The BSSIDs of home access points are registered in the home AP table 112. The connection control unit 122 determines whether an access point is a home access point. Thresholds used for connection control (for example, the above thresholds Th11 and Th12) are registered in the threshold table 113. The thresholds may be preset at the time of manufacture or shipment of the mobile communication device 100. Alternatively, after the shipment, the thresholds may be renewed when software is updated.

When the wireless communication unit 101 scans for an access point, the reception strength determination unit 121 acquires a scan result from the wireless communication unit 101. The scan result includes the BSSID and the ESSID of the detected access point and a measured RSSI. If the reception strength determination unit 121 acquires a scan result while the mobile communication device 100 is not connected to any access point, the reception strength determination unit 121 compares the measured RSSI with the smallest connection threshold (for example, the connection threshold Th11) of a plurality of the connection thresholds. If the RSSI is above the smallest connection threshold, the reception strength determination unit 121 notifies the connection control unit 122 of the scan result.

The connection control unit 122 controls the access point scanning operation and the access point connection and disconnection operations performed by the wireless communication unit 101. If use of wireless LAN communication is selected by the mobile communication device 100 and the mobile communication device 100 is not connected to any access point, the connection control unit 122 periodically (for example, every 150 seconds) instructs the wireless communication unit 101 to perform scanning for access points. When the connection control unit 122 acquires the scan result from the reception strength determination unit 121, the connection control unit 122 determines whether to connect the mobile communication device 100 to the detected access point. If the connection control unit 122 determines to connect the mobile communication device 100 to the detected access point, the connection control unit 122 instructs the wireless communication unit 101 to establish connection with the access point.

When determining whether to allow the mobile communication device 100 to connect to a detected access point, the connection control unit 122 checks whether the ESSID of the detected access point is registered in the connection history table 111 (whether the ESSID is registered as a connection history). If the ESSID is not registered, the connection control unit 122 determines not to allow the mobile communication device 100 to connect to the access point. If the ESSID is registered, the connection control unit 122 compares the measured RSSI with a connection threshold registered in the threshold table 113. If the RSSI is equal to or less than the connection threshold, the connection control unit 122 determines not to allow the mobile communication device 100 to connect to the access point. If the RSSI is above the connection threshold, the connection control unit 122 determines to allow the mobile communication device 100 to connect to the access point. In this operation, if the BSSID of the detected access point is registered in the home AP table 112, namely, if the detected access point is determined to be a home access point, the connection control unit 122 selects a low connection threshold. If the BSSID of the detected access point is not registered in the home AP table 112, namely, if the detected access point is determined to be a public access point, the connection control unit 122 selects a high connection threshold.

In addition, in response to a request from the user, the connection control unit 122 instructs the wireless communication unit 101 to perform scanning for access points. When acquiring a scan result from the reception strength determination unit 121, the connection control unit 122 displays a list of detected access points on the display 106. If the user selects any one of the access points on the list, the connection control unit 122 instructs the wireless communication unit 101 to establish connection with the selected access point.

In addition, when the mobile communication device 100 has been connected to an access point, the connection control unit 122 calculates connection time with the access point by using the method illustrated in FIGS. 5A and 5B. Next, the connection control unit 122 determines whether the access point is a home access point or a public access point on the basis of the calculated connection time. If the connection time is long, the access point is determined to be a home access point. If the connection time is short, the access point is determined to be a public access point. The connection control unit 122 registers the BSSID of the home access point in the home AP table 112.

The timer management unit 123 uses a timer mechanism (for example, a timer function of the OS or a hardware timer) to manage timing of scanning, for example. The timer management unit 123 receives a timer request including specified time from other units such as the connection control unit 122. If the specified time elapses after the reception of the timer request, the timer management unit 123 outputs a timer interrupt to the unit that has issued the timer request.

Figure 7:
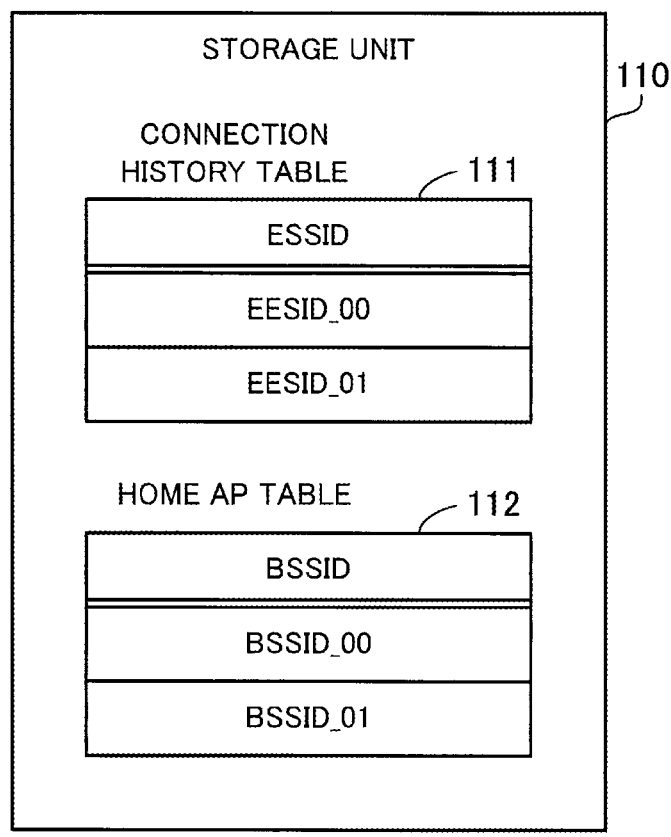
FIG. 7 illustrates an exemplary connection history table and an exemplary home access point (AP) table.

FIG. 7 illustrates an exemplary connection history table 111 and an exemplary home AP table 112.

The connection history table 111 includes a list of ESSIDs. The ESSIDs of access points to which the mobile communication device 100 has previously been connected in accordance with instructions from the user are registered in the connection history table 111. In the example in FIG. 7, "ESSID_00" and "ESSID_01" are registered in the connection history table 111. Alternatively, instead of or together with the ESSIDs, the BSSIDs of access points to which the mobile communication device 100 has previously been connected may be registered in the connection history table 111. In such case, the mobile communication device 100 may be allowed to automatically connect only to access points having the same BSSIDs (namely, physically the same access points) as those of the access points that the user has previously selected.

The home AP table 112 includes a list of BSSIDs. The BSSIDs of access points determined to be home access points are registered in the home AP table 112. In the example in FIG. 7, "BSSID_00" and "BSSID_01" are registered in the home AP table 112. In addition, the BSSID of an access point located in the user's home or office may be directly registered in the home AP table 112 by a user operation.

Hereinafter, as needed, the second embodiment will be described assuming that "ESSID_00" and "BSSID_02" are given to the access point 11 and that "ESSID_01" and "BSSID_00" are given to the access point 12.

FIG. 8 illustrates an exemplary threshold table 113.

The threshold table 113 includes a list of entries in each of which a name of a threshold and a corresponding RSSI value as the threshold are associated with each other. Examples of the thresholds include a home AP connection threshold and a public AP connection threshold. The home AP connection threshold corresponds to the above connection threshold Th11 and is an RSSI criterion for determining whether to allow the mobile communication device 100 to connect to a detected home access point. The public AP connection threshold corresponds to the above connection threshold Th12 and is an RSSI criterion for determining whether to allow the mobile communication device 100 to connect to a detected public access point.

In the example in FIG. 8, "RSSI_00" and "RSSI_20" are registered as the home AP connection threshold and the public AP connection threshold, respectively, in the threshold table 113. Regarding an RSSI according to the second embodiment, a two-digit value represents a connection threshold. The connection threshold is proportional to the RSSI. The larger the RSSI value is, the larger the connection threshold is. Accordingly, in FIG. 8, the public AP connection threshold is larger than the home AP connection threshold. For example, the home AP connection threshold=RSSI_00 corresponds to −80 dBm, and the public AP connection threshold=RSSI_20 corresponds to −60 dBm.

In addition, a home AP disconnection threshold, which is an RSSI criterion for determining whether to disconnect the mobile communication device 100 from the home access point, may be set to a value that is smaller than the home AP connection threshold by a predetermined value (for example, 5 dBm). In addition, a public AP disconnection threshold, which is an RSSI criterion for determining whether to disconnect the mobile communication device 100 from the public access point, may be set to a value that is smaller than the public AP connection threshold by a predetermined value (for example, 5 dBm). In the example in FIG. 8, since it is possible to calculate the home AP disconnection threshold and the public AP disconnection threshold from the home AP connection threshold and the public AP connection threshold, respectively, the disconnection thresholds are not registered in the threshold table 113. Alternatively, the home AP disconnection threshold and the public AP disconnection threshold may be registered in the threshold table 113.

Next, a method for determining whether to allow the mobile communication device 100 to connect to the access points 11 and 12 will be described.

Figure 9:
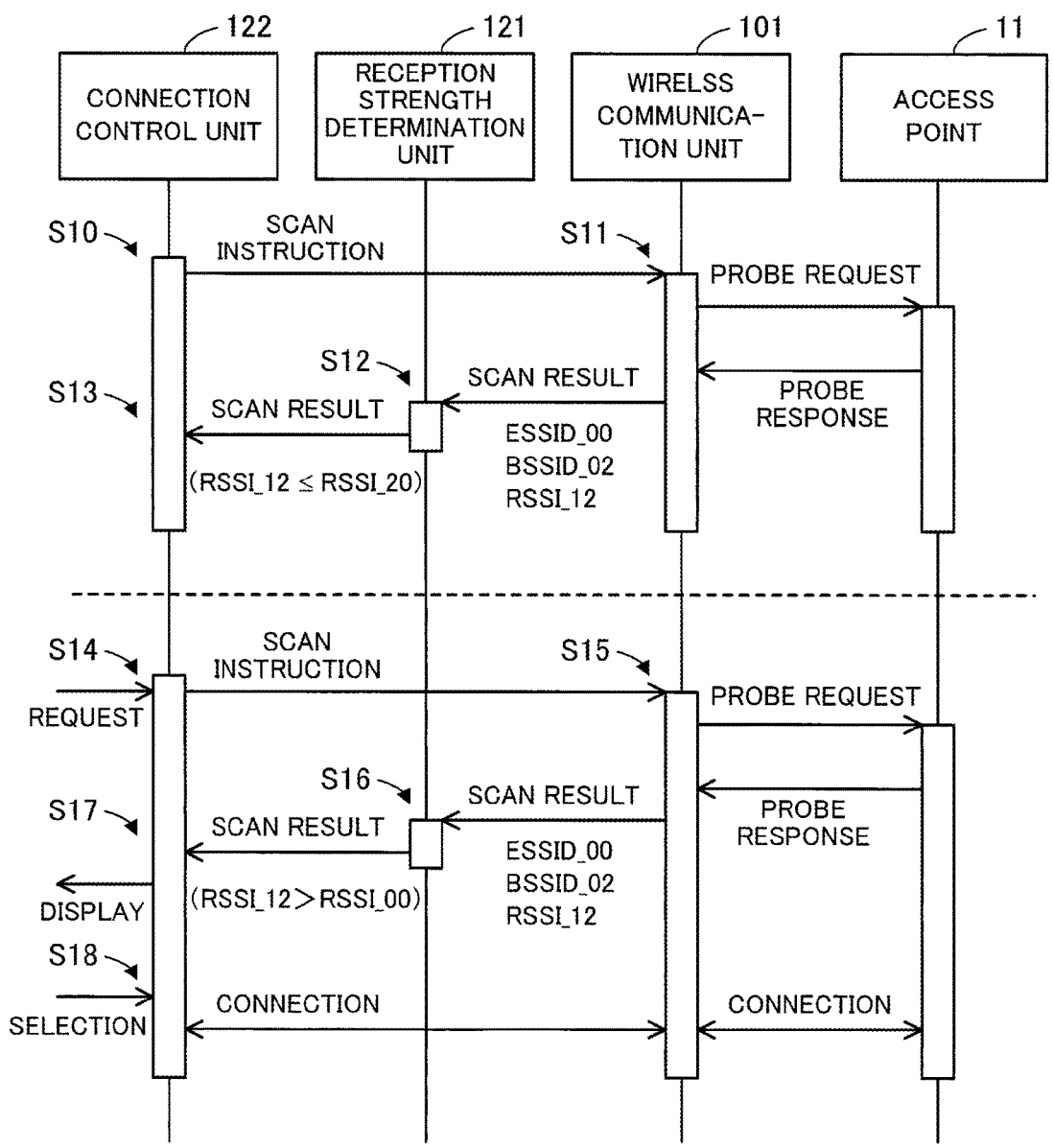
FIG. 9 is a sequence diagram illustrating a first example of a procedure for determining whether to allow the mobile communication device to connect to an access point.

FIG. 9 is a sequence diagram illustrating a first example of a procedure for determining whether to allow the mobile communication device 100 to connect to an access point.

Hereinafter, a case in which the mobile communication device 100 performs an active scan to scan for access points will be described. In the active scan, the mobile communication device 100 transmits a message called a probe request. An access point that has received the probe request transmits a message called a probe response in response to the probe request. The probe response includes the ESSID and the BSSID of the source access point. The mobile communication device 100 detects presence of the access point by receiving the probe response from the access point.

Alternatively, the mobile communication device 100 may perform a passive scan to scan for access points. In the passive scan, each access point transmits a message called a beacon at predetermined intervals. The beacon includes the ESSID and the BSSID of the source access point. The mobile communication device 100 detects presence of access points by monitoring received signals for a certain period of time and detecting beacons.

Next, a case in which the mobile communication device 100 automatically connects to an access point without a user request will be described. When a predetermined period of time elapses after the last scanning operation, the connection control unit 122 instructs the wireless communication unit 101 to perform scanning (S10). The wireless communication unit 101 transmits a probe request in accordance with the instruction from the connection control unit 122. The example in FIG. 9 assumes that an access point 11, which is a public access point, exists around the mobile communication device 100. Next, the wireless communication unit 101 receives a probe response from the access point 11 (S11).

The wireless communication unit 101 measures an RSSI when receiving the probe response. The following description will be made assuming that the measured RSSI is "RSSI_12" and that "ESSID_00" and "BSSID_02" are included in the probe response. Next, the wireless communication unit 101 notifies the reception strength determination unit 121 of a scan result including "ESSID_00," "BSSID_02," and "RSSI_12." The reception strength determination unit 121 determines that the measured RSSI is above the smallest connection threshold (the home AP connection threshold), namely, determines that RSSI_12>RSSI_00, and notifies the connection control unit 122 of the scan result (S12).

The connection control unit 122 determines that "ESSID_00" included in the scan result is registered in the connection history table 111. Next, the connection control unit 122 determines that "BSSID_02" is not registered in the home AP table 112 and selects the public AP connection threshold as the corresponding connection threshold. Next, the connection control unit 122 determines that the measured RSSI is equal to or less than the public AP connection threshold, namely, determines that RSSI_12≤RSSI_20. Thus, the connection control unit 122 determines not to allow the mobile communication device 100 to connect to the detected access point 11 (S13).

Next, a case in which the mobile communication device 100 receives a request for use of a wireless LAN via a user operation will be described. First, the connection control unit 122 instructs the wireless communication unit 101 to perform scanning (S14). In response to the instruction from the connection control unit 122, the wireless communication unit 101 transmits a probe request. As in step S11, the wireless communication unit 101 receives a probe response from the access point 11 (S15). The following description will be made assuming that the measured RSSI is RSSI_12, as is the case in step S11.

Next, the wireless communication unit 101 notifies the reception strength determination unit 121 of a scan result including "ESSID_00," "BSSID_02," and "RSSI_12." The reception strength determination unit 121 determines that RSSI_12>RSSI_00 and notifies the connection control unit 122 of the scan result (S16). The connection control unit 122 displays "ESSID_00" included in the scan result on the display 106 (S17). If any other access points have been detected, the connection control unit 122 also displays the ESSIDs of the other access points on the display 106.

If the user selects "ESSID_00" that corresponds to the access point 11 from the ESSIDs displayed on the display 106, the connection control unit 122 instructs the wireless communication unit 101 to connect the mobile communication device 100 to the access point 11. The wireless communication unit 101 performs a connection procedure with the access point 11 (S18). In this way, the connection between the mobile communication device 100 and the access point 11 is established, and packet communication therebetween is enabled.

Figure 10:
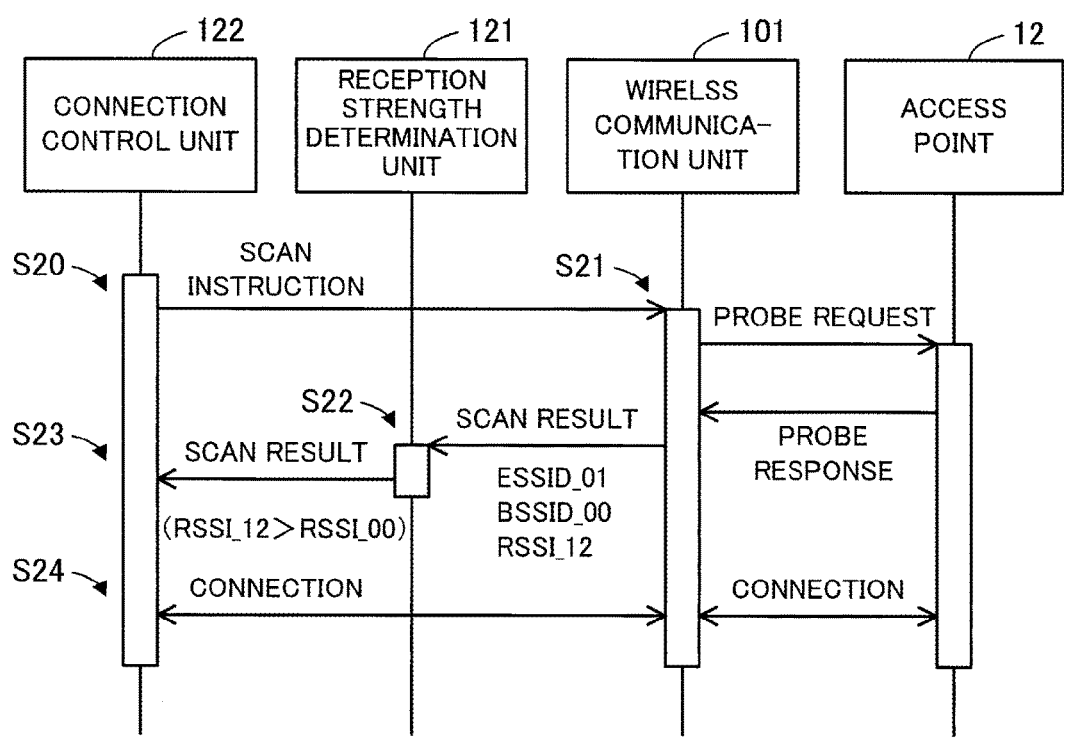
FIG. 10 is a sequence diagram illustrating a second example of a procedure for determining whether to allow the mobile communication device to connect to an access point.

FIG. 10 is a sequence diagram illustrating a second example of a procedure for determining whether to allow the mobile communication device 100 to connect to an access point.

Next, a case in which the mobile communication device 100 automatically connects to an access point without a user request will be described. When a predetermined period of time elapses after the last scanning operation, the connection control unit 122 instructs the wireless communication unit 101 to perform scanning (S20). The wireless communication unit 101 transmits a probe request in accordance with the instruction from the connection control unit 122. The example in FIG. 10 assumes that an access point 12, which is a home access point, exists around the mobile communication device 100. Next, the wireless communication unit 101 receives a probe response from the access point 12 (S21).

The wireless communication unit 101 measures an RSSI when receiving the probe response. The following description will be made assuming that the measured RSSI is "RSSI_12" and that "ESSID_01" and "BSSID_00" are included in the probe response. Next, the wireless communication unit 101 notifies the reception strength determination unit 121 of a scan result including "ESSID_01," "BSSID_00," and "RSSI_12." The reception strength determination unit 121 determines that RSSI_12>RSSI_00 and notifies the connection control unit 122 of the scan result (S22).

The connection control unit 122 determines that "ESSID_01" included in the scan result is registered in the connection history table 111. Next, the connection control unit 122 determines that "BSSID_00" is registered in the home AP table 112 and selects the home AP connection threshold as the connection threshold. Next, the connection control unit 122 determines that the measured RSSI is above the home AP connection threshold, namely, determines that RSSI_12>RSSI_00. Thus, the connection control unit 122 determines to allow the mobile communication device 100 to connect to the detected access point 12 (S23). The connection control unit 122 instructs the wireless communication unit 101 to connect the mobile communication device 100 to the access point 12. The wireless communication unit 101 performs a connection procedure with the access point 12 (S24).

As described above, in the automatic connection processing in which the mobile communication device 100 is automatically connected to an access point without a user request, if a public access point is detected, the measured RSSI is compared with the larger connection threshold. As a result, in the automatic connection processing, the mobile communication device 100 is not easily connected to the public access point. In contrast, if a home access point is detected, the measured RSSI is compared with the smaller connection threshold. As a result, the mobile communication device 100 is more easily connected to the home access point than to the public access point. However, in the manual connection processing in which the mobile communication device 100 is connected to an access point in accordance with a user operation, even when a public access point is detected, the measured RSSI is compared with the smaller connection threshold. As a result, in the manual connection processing, the mobile communication device 100 is easily connected to the public access point as well.

Figure 11:
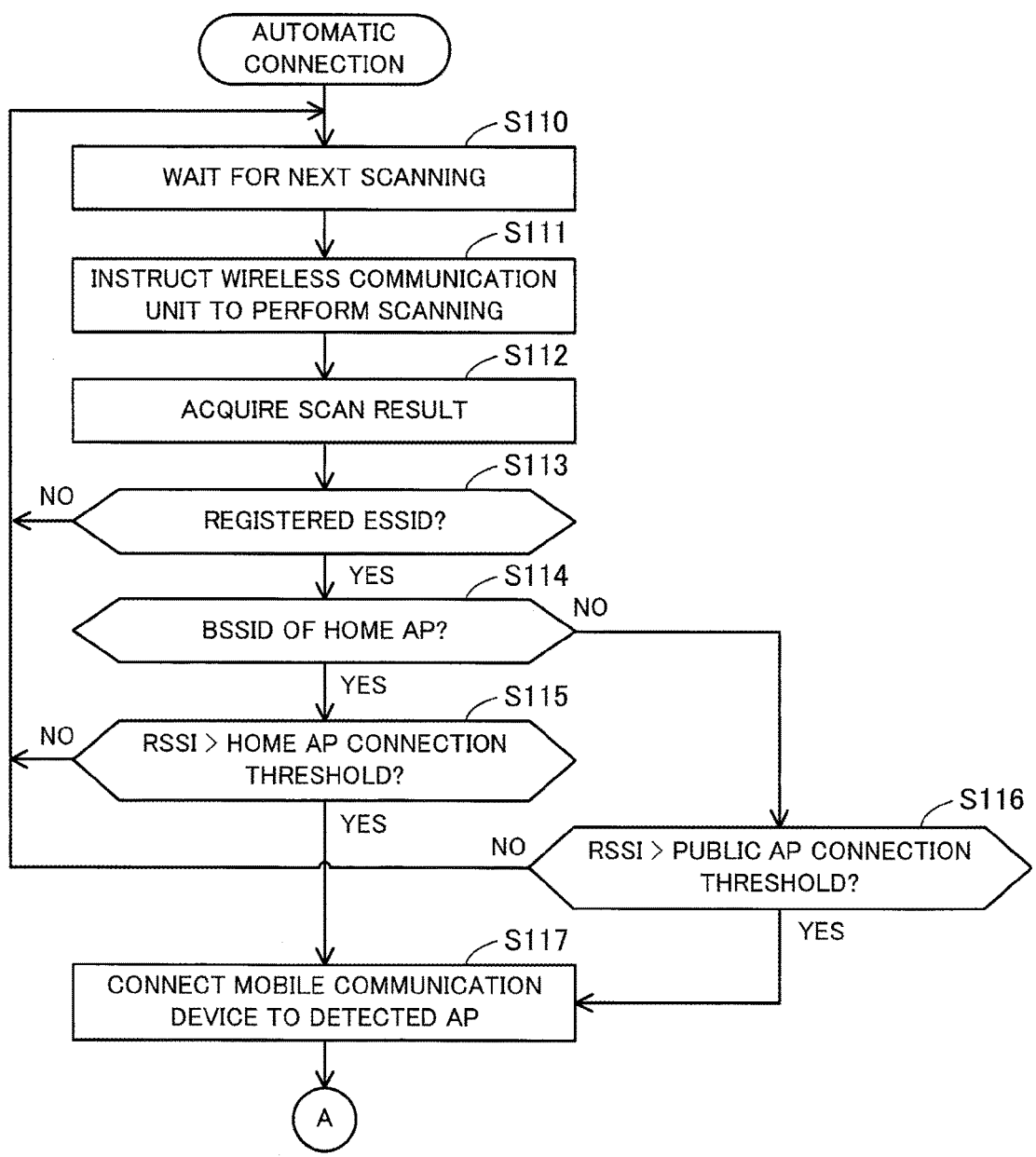
FIGS. 11 and 12 are flowcharts illustrating an exemplary automatic connection procedure.

FIG. 11 is a flowchart illustrating an exemplary automatic connection procedure.

(S110) The connection control unit 122 waits for next scanning. For example, scanning is performed every 150 seconds. The timer management unit 123 may be used to manage when to perform scanning.

(S111) The connection control unit 122 instructs the wireless communication unit 101 to perform scanning.

(S112) The reception strength determination unit 121 acquires a scan result from the wireless communication unit 101. The scan result includes the ESSID and the BSSID of the detected access point and a measured RSSI. If the RSSI is above the smallest connection threshold (the home AP connection threshold), the connection control unit 122 acquires the scan result from the reception strength determination unit 121.

(S113) The connection control unit 122 determines whether the ESSID included in the scan result is registered in the connection history table 111, namely, whether the ESSID is registered as a connection history. If the ESSID is registered, the processing proceeds to step S114. If not, the processing proceeds to step S110.

(S114) The connection control unit 122 determines whether the BSSID included in the scan result is registered in the home AP table 112, namely, whether the BSSID is the BSSID of a home access point. If the BSSID is the BSSID of a home access point, the processing proceeds to step S115. If not, the processing proceeds to step S116.

(S115) The connection control unit 122 acquires a corresponding home AP connection threshold from the threshold table 113. The connection control unit 122 determines whether the RSSI included in the scan result is above the home AP connection threshold. If the RSSI is above the home AP connection threshold, the processing proceeds to step S117. If not, the processing proceeds to step S110.

(S116) The connection control unit 122 acquires a corresponding public AP connection threshold from the threshold table 113. The connection control unit 122 determines whether the RSSI included in the scan result is above the public AP connection threshold. If the RSSI is above the public AP connection threshold, the processing proceeds to step S117. If not, the processing proceeds to step S110.

(S117) The connection control unit 122 instructs the wireless communication unit 101 to establish connection with the detected access point. Next, the processing proceeds to step S118.

Figure 12:
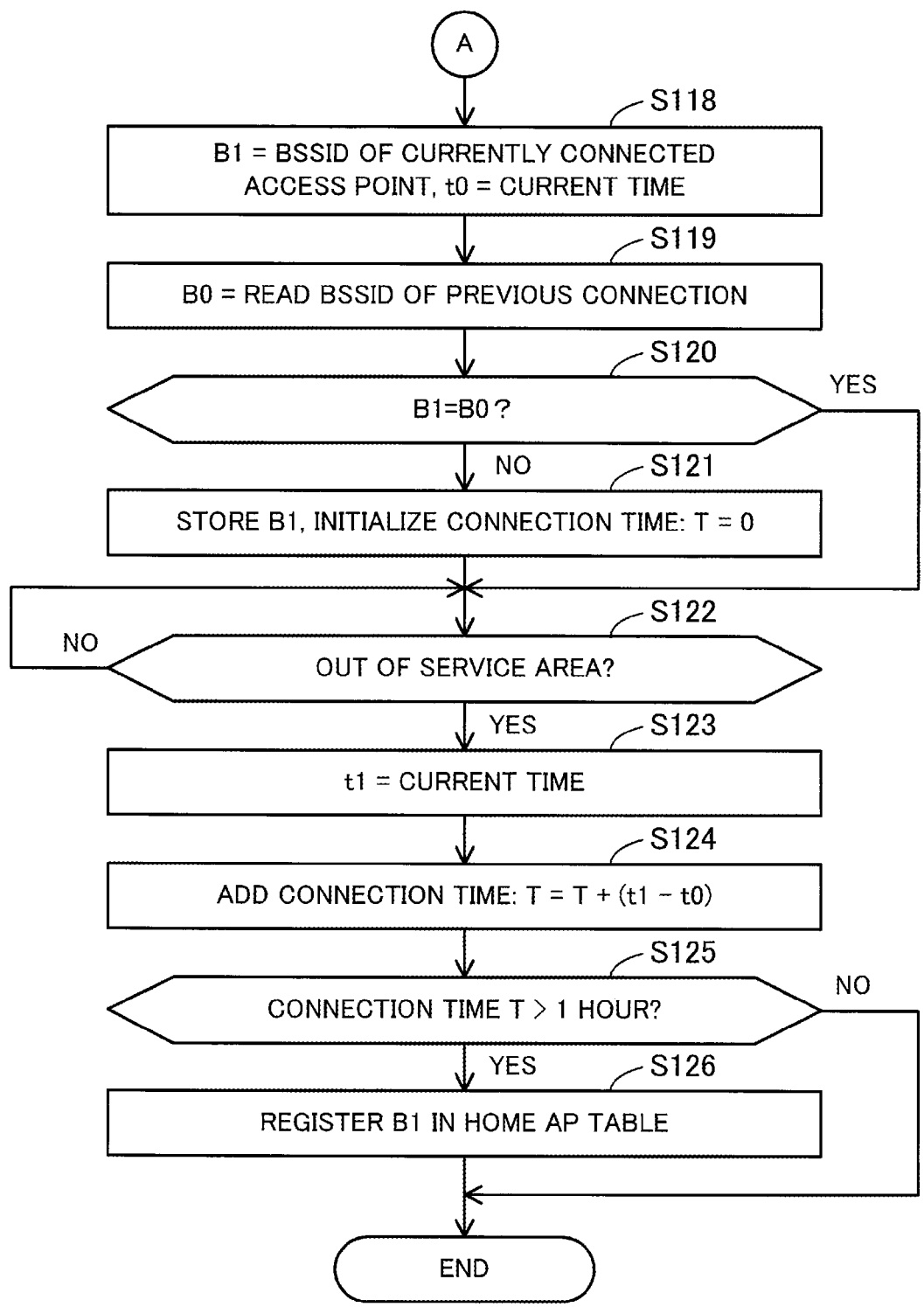

FIG. 12 is a flowchart that follows the flowchart in FIG. 11.

(S118) The connection control unit 122 sets the BSSID of the access point to which the mobile communication device 100 has been connected as B1 and sets the current time as t0. As described below, the BSSID of the previously-connected access point is stored in the storage unit 110.

(S119) The connection control unit 122 reads the BSSID of the previously-connected access point from the storage unit 110 and sets the read BSSID as B0.

(S120) The connection control unit 122 determines whether B1=B0, namely, whether the currently-connected access point is the same as the previously-connected access point. If the access points are identical, the processing proceeds to step S122. If not, the processing proceeds to step S121.

(S121) The connection control unit 122 stores B1 in the storage unit 110. In addition, the connection control unit 122 initializes T representing the accumulated connection time to zero.

(S122) The connection control unit 122 determines whether the mobile communication device 100 has been brought out of the service area of the currently-connected access point. For example, the wireless communication unit 101 detects whether the mobile communication device 100 has been brought out of the service area. If the mobile communication device 100 has been brought out of the service area, the processing proceeds to step S123. If not, the processing repeats step S122.

(S123) The connection control unit 122 sets the current time as t1.

(S124) The connection control unit 122 adds (t1−t0) to T. Namely, the connection control unit 122 adds the time for which the last connection has been maintained (a duration of time between establishment and disconnection of the last connection with the detected access point) to the accumulated connection time.

(S125) The connection control unit 122 determines whether the accumulated connection time T is above a predetermined time threshold (for example, one hour). If T is above the predetermined time threshold, the processing proceeds to step S126. If not, the automatic connection processing proceeds to end.

(S126) The connection control unit 122 registers B1 in the home AP table 112. Namely, the access point to which the mobile communication device 100 has been connected last is assumed to be a home access point.

Figure 13:
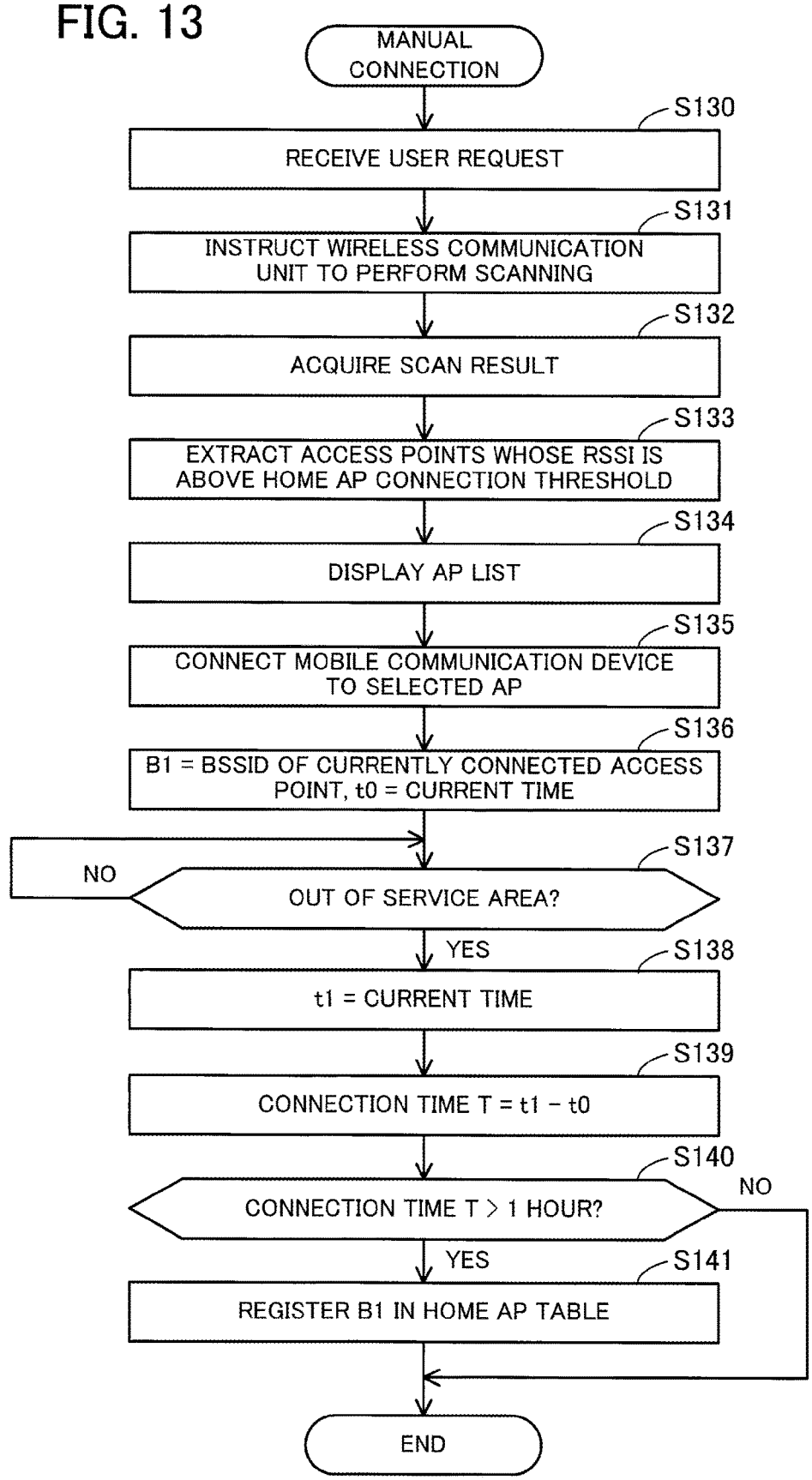
FIG. 13 is a flowchart illustrating an exemplary manual connection procedure.

FIG. 13 is a flowchart illustrating an exemplary manual connection procedure.

(S130) The connection control unit 122 receives a user request to use a wireless LAN.

(S131) The connection control unit 122 instructs the wireless communication unit 101 to perform scanning.

(S132) The reception strength determination unit 121 acquires a scan result from the wireless communication unit 101. The scan result includes the ESSID and the BSSID of at least one detected access point and a measured RSSI. If the RSSI is above the smallest connection threshold (the home AP connection threshold), the connection control unit 122 acquires the scan result from the reception strength determination unit 121.

(S133) The connection control unit 122 acquires a corresponding home AP connection threshold from the threshold table 113. If a plurality of access points have been detected, the connection control unit 122 selects those whose RSSI is above the home AP connection threshold.

(S134) The connection control unit 122 displays information about the access points extracted in step S133 on the display 106. For example, the connection control unit 122 displays a list of ESSIDs of the extracted access points on the display 106.

(S135) The connection control unit 122 acquires information about an access point selected from the list by the user (for example, the BSSID of the selected access point). The connection control unit 122 instructs the wireless communication unit 101 to establish connection with the selected access point.

(S136) The connection control unit 122 sets the BSSID of the currently-connected access point as B1 and sets the current time as t0.

(S137) The connection control unit 122 determines whether the mobile communication device 100 has been brought out of the service area of the currently-connected access point. For example, the wireless communication unit 101 detects whether the mobile communication device 100 has been brought out of the service area. If the mobile communication device 100 has been brought out of the service area, the processing proceeds to step S138. If not, the processing repeats step S137.

(S138) The connection control unit 122 sets the current time as t1.

(S139) The connection control unit 122 adds (t1−t0) to accumulated connection time T. Namely, the connection control unit 122 adds the time for which the last connection has been maintained (a duration of time between establishment and disconnection of the last connection with the detected access point) to the accumulated connection time.

(S140) The connection control unit 122 determines whether the accumulated connection time T is above a predetermined time threshold (for example, one hour). If T is above the predetermined time threshold, the processing proceeds to step S141. If not, the manual connection processing proceeds to end.

(S141) The connection control unit 122 registers B1 in the home AP table 112. Namely, the access point to which the mobile communication device 100 has been connected last is assumed to be a home access point.

In the mobile communication system according to the second embodiment, if the mobile communication device 100 detects a public access point, a measured RSSI is compared with the larger connection threshold (the public AP connection threshold). In this way, the mobile communication device 100 is not connected to every single public access point against the user's will each time when the user passes by one while travelling. Namely, since the mobile communication device 100 performs connection to and disconnection from many access points in town less repeatedly, the power consumed by the mobile communication device 100 is reduced. In addition, even if the mobile communication device 100 is performing communication on the mobile phone network 20, the possibility of disconnection of the communication is reduced.

In addition, if the mobile communication device 100 detects a home access point, a measured RSSI is compared with the smaller connection threshold (the home AP connection threshold). In this way, the mobile communication device 100 is easily connected to and not easily disconnected from the home access point. Thus, the mobile communication device 100 performs stable communication at the user's home or office or the like.

In addition, when the mobile communication device 100 is connected to an access point, the connection time is monitored. If the connection time is long, the mobile communication device 100 determines the access point to be a home access point. The mobile communication device 100 associates a smaller connection threshold with the access point determined to be a home access point and associates larger connection thresholds with access points other than the home access point. In this way, connectivity per access point is appropriately adjusted, without requiring the user to set a connection threshold or a connection priority level for each access point. Thus, the operational burden on the user is reduced.

Third Embodiment

Next, a third embodiment will be described. The following description will be made with a focus on the difference between the above second embodiment and the third embodiment, and redundant description will be omitted.

There are users who wish their mobile communication device 100 to remain disconnected to a public access point when they are merely passing by a shop having the public access point. However, these users wish their mobile communication device 100 to be automatically connected to the public access point when they enter the shop. The signal level of a wireless signal propagating to the outside of a shop varies depending on the public access point. Therefore, in the third embodiment, an individual connection threshold is set for each public access point to which the mobile communication device 100 has previously been connected so that unintended connections to public access points are further reduced.

A mobile communication system according to the third embodiment is realized by using the same elements as those included in the mobile communication system according to the second embodiment illustrated in FIG. 2. In addition, a mobile communication device according to the third embodiment is realized by using the same elements as those included in the mobile communication device 100 according to the second embodiment illustrated in FIGS. 3 and 6. Hereinafter, the third embodiment will be described by using the reference characters used in FIGS. 2, 3, and 6.

FIG. 14 illustrates an exemplary public AP table 114.

The public AP table 114 is stored in the storage unit 110. The public AP table 114 includes columns for BSSIDs and individual connection thresholds. A BSSID included in the public AP table 114 is the BSSID of an access point determined as a public access point to which the mobile communication device 100 has previously been connected. An Individual connection threshold is a criteria RSSI value used for determining whether to connect the mobile communication device 100 to a public access point represented by its BSSID. The individual connection thresholds are preferentially applied to the public access points registered in the public AP table 114 over the public AP connection threshold. When the mobile communication device 100 performs packet communication by using a public access point, the mobile communication device 100 determines an individual connection threshold for the public access point. Individual connection thresholds are normally larger than home AP connection thresholds.

Figure 15:
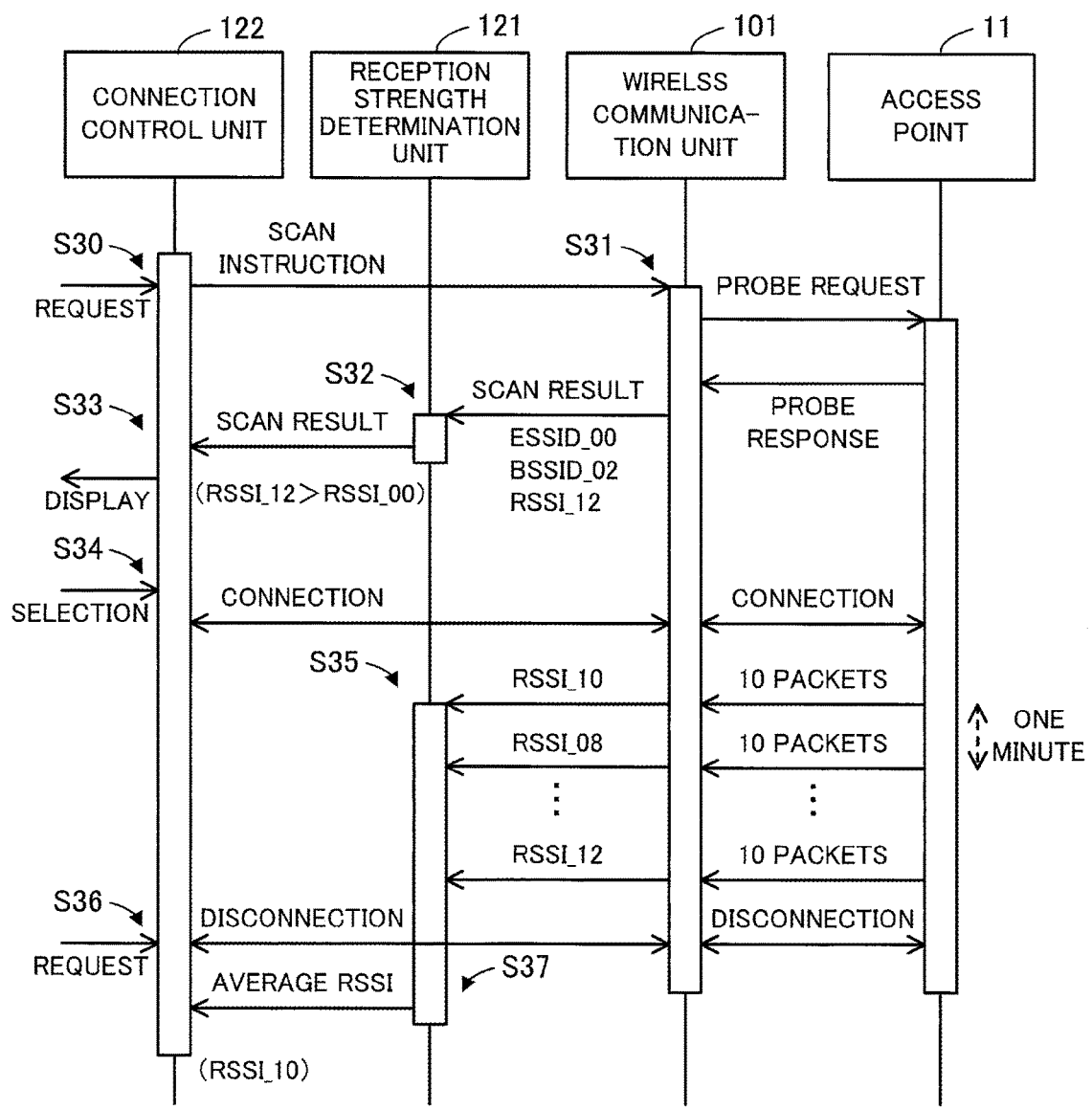
FIG. 15 is a sequence diagram illustrating a first example of a procedure for calculating an individual connection threshold.

FIG. 15 is a sequence diagram illustrating a first example of a procedure for calculating an individual connection threshold.

When receiving a user request to use a wireless LAN, the connection control unit 122 instructs the wireless communication unit 101 to perform scanning (S30). In response to the instruction from the connection control unit 122, the wireless communication unit 101 transmits a probe request. In the example in FIG. 15, the access point 11, which is a public access point, exists around the mobile communication device 100. Therefore, the wireless communication unit 101 receives a probe response from the access point 11 (S31).

When receiving the probe response, the wireless communication unit 101 measures an RSSI. This example will be described assuming that the measured RSSI represents "RSSI_12" and that "ESSID_00" and "BSSID_02" are included in the probe response. Next, the wireless communication unit 101 notifies the reception strength determination unit 121 of a scan result including "ESSID_00," "BSSID_02," and "RSSI_12." The reception strength determination unit 121 determines that the measured RSSI is above the smallest connection threshold (the home AP connection threshold), namely, determines that RSSI_12>RSSI_00, and notifies the connection control unit 122 of the scan result (S32).

The connection control unit 122 displays "ESSID_00" included in the scan result on the display 106 (S33). If any other access points have been detected, the connection control unit 122 also displays the ESSIDs of the other access points on the display 106. If the user selects "ESSID_00," which corresponds to the access point 11, from the ESSIDs displayed on the display 106, the connection control unit 122 instructs the wireless communication unit 101 to connect the mobile communication device 100 to the access point 11. The wireless communication unit 101 performs a connection procedure with the access point 11 (S34).

The wireless communication unit 101 performs measurement of an RSSI 10 times by sampling 10 packets per minute. Packets other than beacons are used for the sampling. Beacons are excluded, since beacons are used as control packets for controlling connection to the access point 11 and may propagate farther than data packets do. The wireless communication unit 101 notifies the reception strength determination unit 121 of the average of the 10 measured RSSIs every minute (S35). The wireless communication unit 101 repeats the measurement of the RSSIs until the mobile communication device 100 is disconnected from the access point 11.

When receiving a disconnection request from the user, the connection control unit 122 instructs the wireless communication unit 101 to disconnect the mobile communication device 100 from the access point 11. The wireless communication unit 101 performs a disconnection procedure with the access point 11 (S36). The reception strength determination unit 121 calculates the average of the RSSIs supplied every minute from the wireless communication unit 101 during the packet communication performed between the mobile communication device 100 and the access point 11 and notifies the connection control unit 122 of the calculated average RSSI. The connection control unit 122 calculates an individual connection threshold for the access point 11 from the average RSSI (S37). For example, the connection control unit 122 sets an RSSI value that is smaller than the average RSSI by a predetermined value (for example, 5 dBm to 10 dBm) as the individual connection threshold. The following description may be made by using "RSSI_10" as the individual connection threshold for the access point 11.

Figure 16:
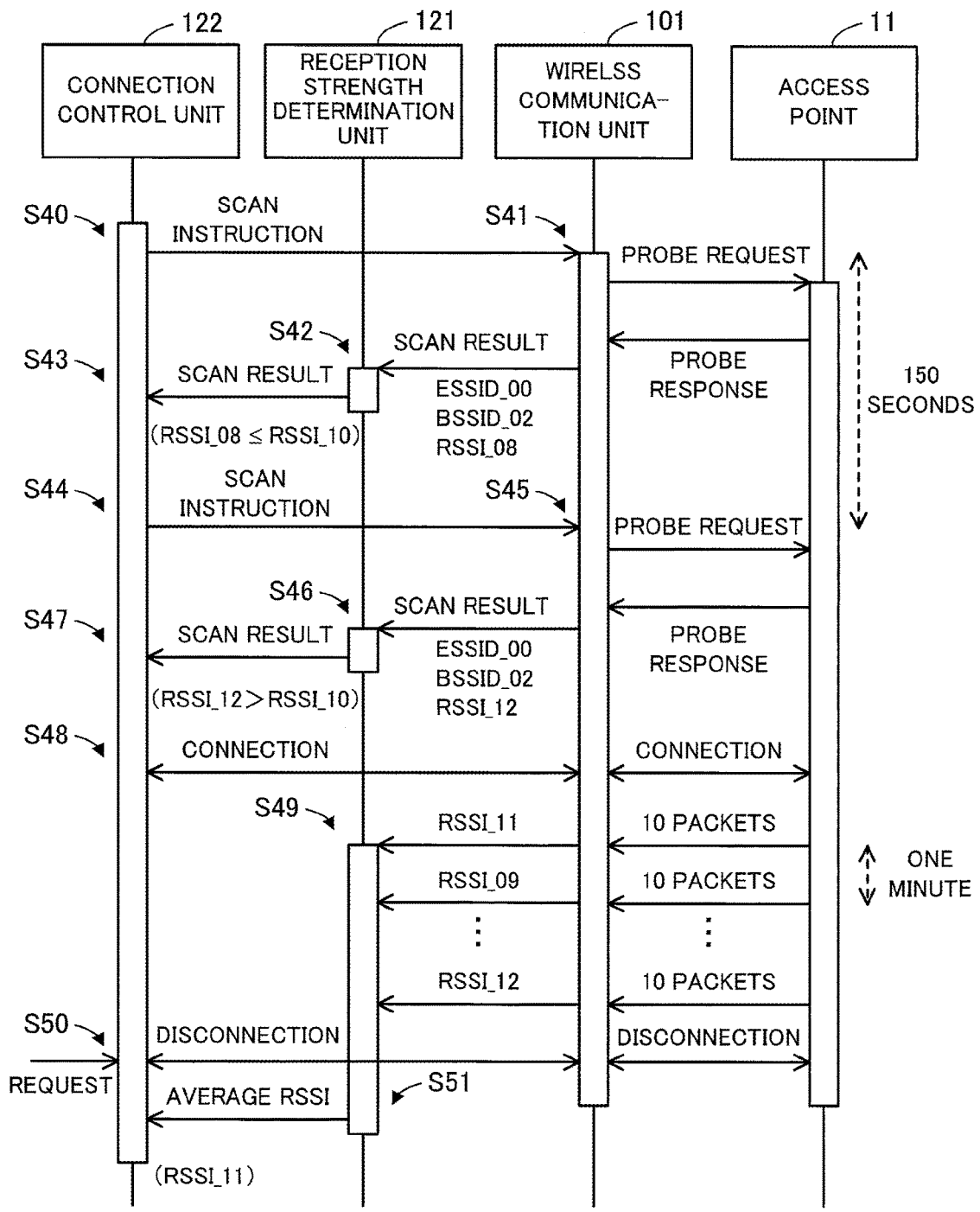
FIG. 16 is a sequence diagram illustrating a second example of a procedure for calculating an individual connection threshold.

FIG. 16 is a sequence diagram illustrating a second example of a procedure for calculating an individual connection threshold.

The connection control unit 122 instructs the wireless communication unit 101 to perform scanning (S40). In response to the instruction from the connection control unit 122, the wireless communication unit 101 transmits a probe request. In the example in FIG. 16, the access point 11 is detected again. The wireless communication unit 101 receives a probe response from the access point 11 (S41). This example will be described assuming that the measured RSSI represents "RSSI_08." Next, the wireless communication unit 101 notifies the reception strength determination unit 121 of a scan result including "ESSID_00," "BSSID_02," and "RSSI_08."

The reception strength determination unit 121 determines that RSSI_08>RSSI_00 and notifies the connection control unit 122 of the scan result (S42). The connection control unit 122 determines that "ESSID_00" included in the scan result is registered in the connection history table 111. Next, the connection control unit 122 determines that "BSSID_02" included in the scan result is not registered in the home AP table 112 and selects the individual connection threshold that corresponds to the access point 11 (namely, "RSSI_10") as the connection threshold. Next, the connection control unit 122 determines that the measured RSSI is equal to or less than the individual connection threshold, namely, determines that RSSI_08≤RSSI_10. Thus, the connection control unit 122 determines not to allow the mobile communication device 100 to connect to the detected access point 11 (S43).

After a predetermined period of time (for example, 150 seconds) has elapsed since the previous scanning, the connection control unit 122 instructs the wireless communication unit 101 to perform scanning (S44). In response to the instruction from the connection control unit 122, the wireless communication unit 101 transmits a probe request. In the example in FIG. 16, the access point 11 is detected again. The wireless communication unit 101 receives a probe response from the access point 11 (S45). This example will be described assuming that the measured RSSI represents "RSSI_12." Next, the wireless communication unit 101 notifies the reception strength determination unit 121 of a scan result including "ESSID_00," "BSSID_02," and "RSSI_12."

The reception strength determination unit 121 determines that RSSI_12>RSSI_00 and notifies the connection control unit 122 of the scan result (S46). The connection control unit 122 determines that "ESSID_00" in the scan result is registered in the connection history table 111. Next, the connection control unit 122 determines that "BSSID_02" in the scan result is not registered in the home AP table 112 and selects the individual connection threshold that corresponds to the access point 11 (namely, "RSSI_10") as the connection threshold. Next, the connection control unit 122 determines that the measured RSSI is above the individual connection threshold, namely, that RSSI_12>RSSI_10. Thus, the connection control unit 122 determines to allow the mobile communication device 100 to connect to the detected access point 11 (S47).

The connection control unit 122 instructs the wireless communication unit 101 to connect the mobile communication device 100 to the access point 11. The wireless communication unit 101 performs a connection procedure with the access point 11 (S48). The wireless communication unit 101 performs measurement of an RSSI ten times by sampling 10 packets per minute. The wireless communication unit 101 notifies the reception strength determination unit 121 of the average of the 10 measured RSSIs per minute (S49). When receiving a disconnection request from the user, the connection control unit 122 instructs the wireless communication unit 101 to disconnect the mobile communication device 100 from the access point 11. The wireless communication unit 101 performs a disconnection procedure with the access point 11 (S50).

The reception strength determination unit 121 calculates the average of the RSSIs supplied from the wireless communication unit 101 per minute and notifies the connection control unit 122 of the calculated average RSSI. The connection control unit 122 updates the individual connection threshold for the access point 11 on the basis of the average RSSI (S51). For example, the individual connection threshold for the access point 11 is updated to "RSSI_11."

Figure 17:
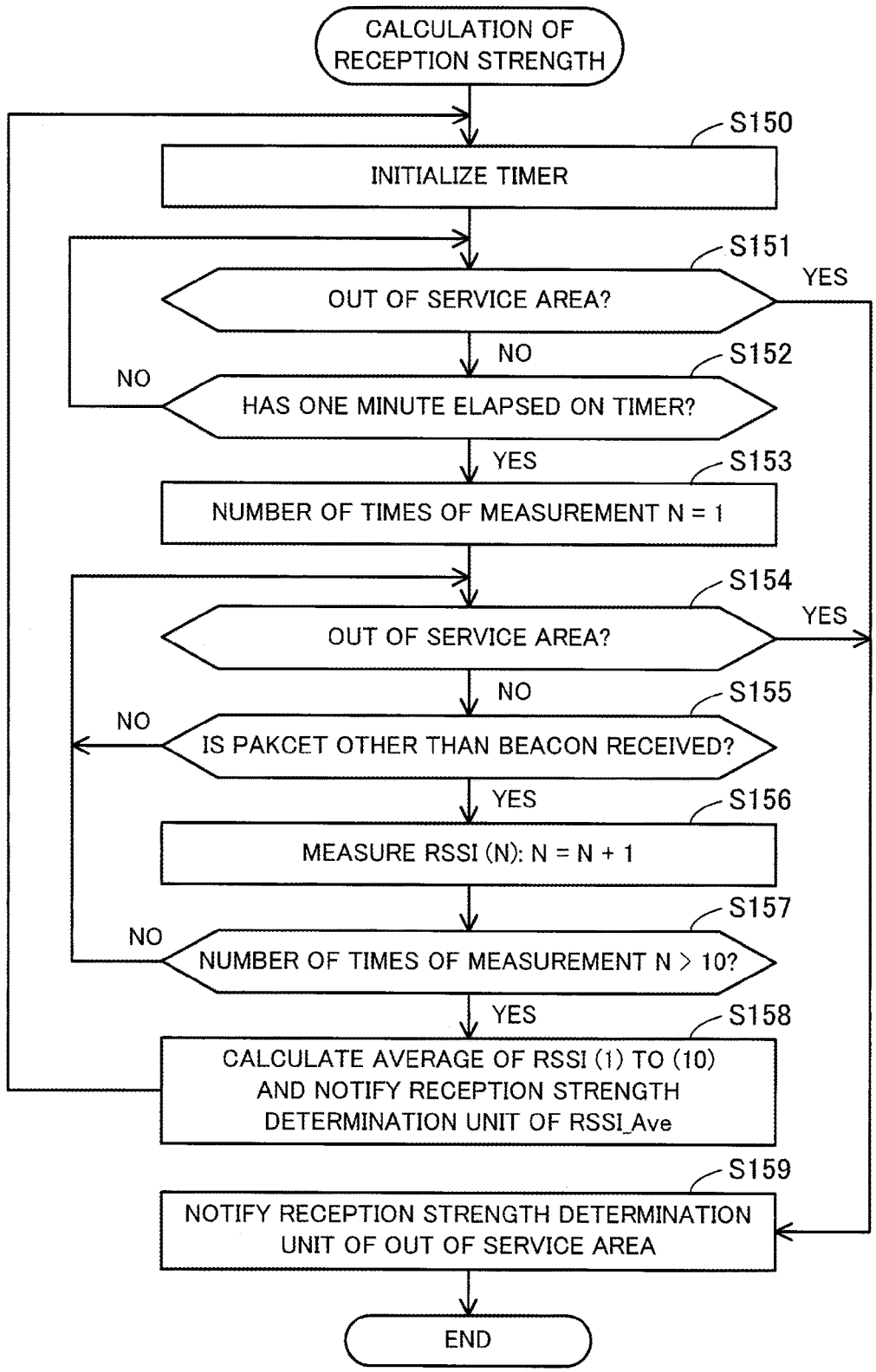
FIG. 17 is a flowchart illustrating an exemplary procedure for calculating reception strength.

FIG. 17 is a flowchart illustrating an exemplary procedure for calculating reception strength.

Reception strength calculation processing is performed by the wireless communication unit 101 after connection has been established.

(S150) After establishing connection, the wireless communication unit 101 initializes the timer.

(S151) The wireless communication unit 101 determines whether the mobile communication device 100 has been brought out of the service area. If the mobile communication device 100 has been brought out of the service area, the processing proceeds to step S159. If not, the processing proceeds to step S152.

(S152) The wireless communication unit 101 determines whether a predetermined period of time (for example, one minute) has elapsed on the timer. If the predetermined period of time has elapsed on the timer, the processing proceeds to step S153. If not, the processing proceeds to step S151.

(S153) The wireless communication unit 101 initializes N, which represents a number of times of measurement to 1.

(S154) The wireless communication unit 101 determines whether the mobile communication device 100 has been brought out of the service area. If the mobile communication device 100 has been brought out of the service area, the processing proceeds to step S159. If not, the processing proceeds to step S155.

(S155) The wireless communication unit 101 determines whether a packet other than a beacon has been received. If the wireless communication unit 101 has received a packet other than a beacon, the processing proceeds to step S156. If not, the processing proceeds to step S154.

(S156) The wireless communication unit 101 measures an RSSI and records the measured RSSI as an RSSI (N). For example, the RSSI (N) is stored in a memory included in the wireless communication unit 101 or the storage unit 110. The number N is incremented by 1.

(S157) The wireless communication unit 101 determines whether the number of times of measurement has exceeded 10, namely, N>10. If so, the processing proceeds to step S158. If not, the processing proceeds to step S154.

(S158) The wireless communication unit 101 calculates the average of the 10 measured RSSIs, namely, the average of RSSI (1) to RSSI (10) that have been stored. The wireless communication unit 101 notifies the reception strength determination unit 121 of the calculated average value represented as an RSSI_Ave. Next, the processing returns to step S150, and another RSSI_Ave for the next one minute is calculated.

(S159) The wireless communication unit 101 notifies the reception strength determination unit 121 that the mobile communication device 100 has been brought out of the service area.

Figure 18:
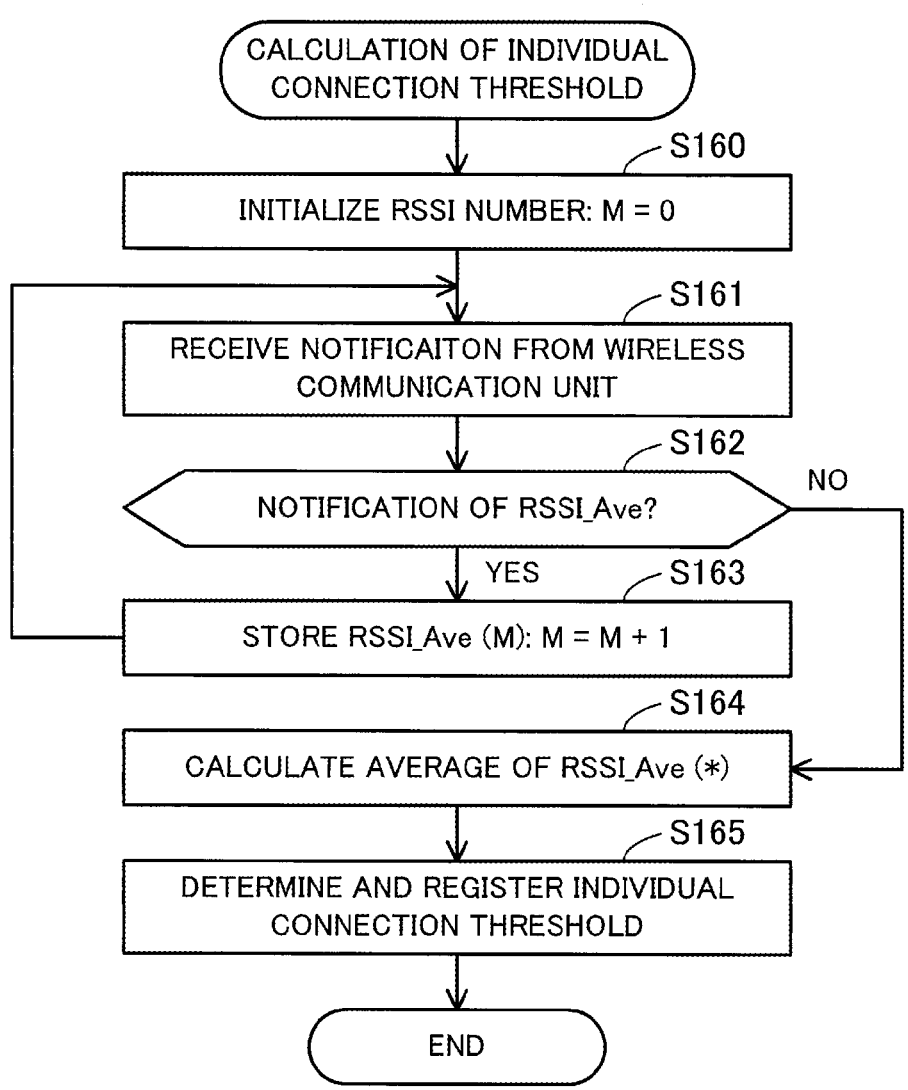
FIG. 18 is a flowchart illustrating an exemplary procedure for calculating an individual connection threshold.

FIG. 18 is a flowchart illustrating an exemplary procedure for calculating an individual connection threshold.

(S160) The reception strength determination unit 121 initializes M, which represents an RSSI number.

(S161) The reception strength determination unit 121 receives a notification from the wireless communication unit 101.

(S162) The reception strength determination unit 121 determines whether the received notification represents an RSSI_Ave. If so, the processing proceeds to step S163. If not (if the notification represents out of the service area), the processing proceeds to step S164.

(S163) The reception strength determination unit 121 records the RSSI_Ave supplied from the wireless communication unit 101 as an RSSI_Ave (M). For example, the RSSI_Ave (M) is stored in the storage unit 110. The number M is incremented by 1, and the processing returns to step S161.

(S164) The reception strength determination unit 121 calculates the average of the RSSI_Ave values supplied from the wireless communication unit 101, namely, the average of RSSI_Ave (1), RSSI_Ave (2), and so on, that have been stored. The calculated average is set as an average RSSI.

(S165) The reception strength determination unit 121 determines an individual connection threshold on the basis of the average RSSI. For example, an RSSI value which is smaller than the average RSSI by a predetermined value (for example, 5 dBm to 10 dBm) is set as the individual connection threshold. The reception strength determination unit 121 associates the individual connection threshold with the BSSID of the previously-connected access point and registers the associated information in the public AP table 114.

Figure 19:
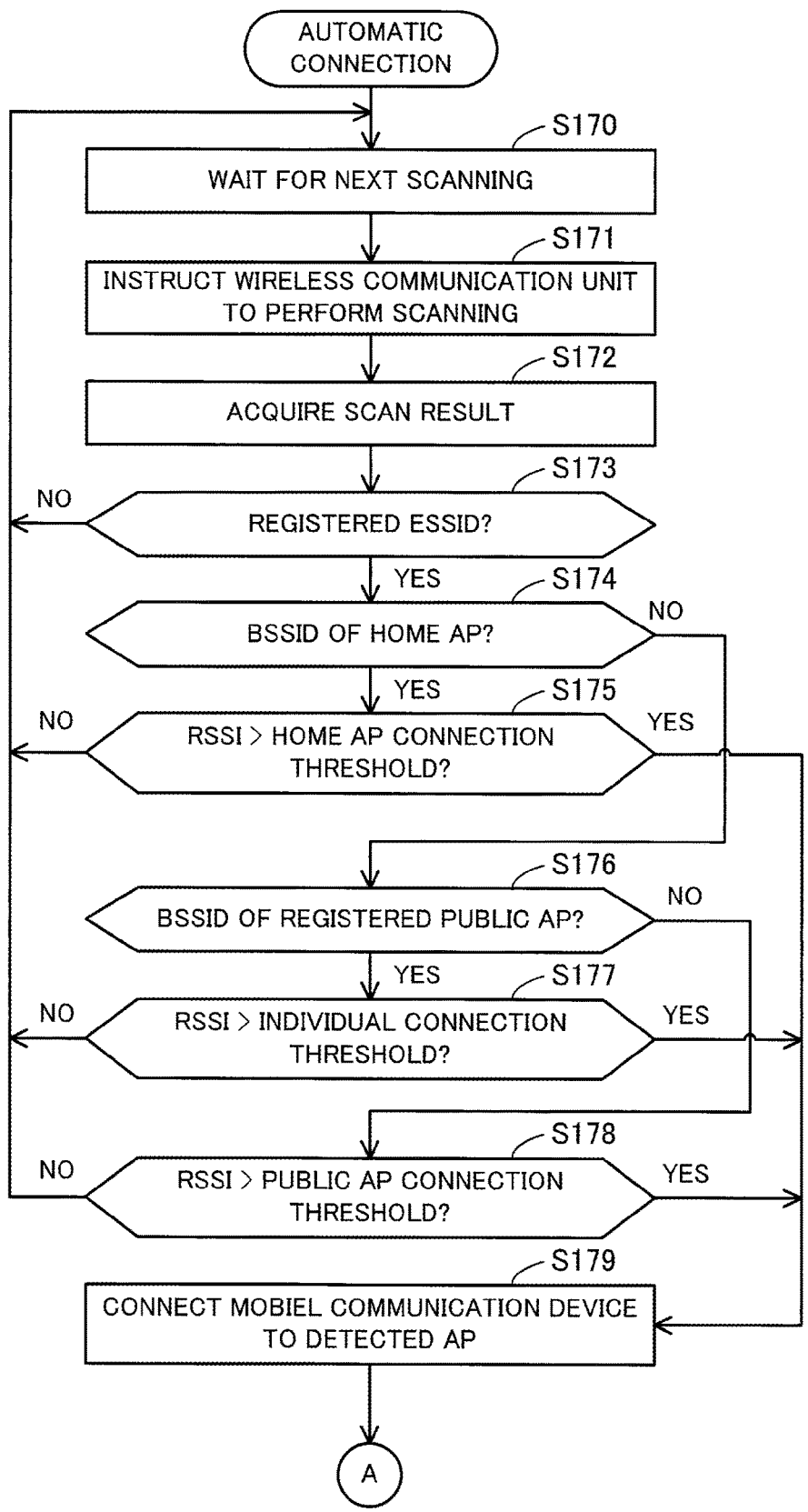
FIG. 19 is a flowchart illustrating another exemplary automatic connection procedure.

FIG. 19 is a flowchart illustrating another exemplary automatic connection procedure.

The automatic connection processing in FIG. 19 corresponds to the automatic connection processing according to the second embodiment illustrated in FIG. 11.

(S170) The connection control unit 122 waits for next scanning. For example, scanning is performed every 150 seconds. The timer management unit 123 may be used to manage when to perform scanning.

(S171) The connection control unit 122 instructs the wireless communication unit 101 to perform scanning.

(S172) The reception strength determination unit 121 acquires a scan result from the wireless communication unit 101. The scan result includes the ESSID and the BSSID of the detected access point and a measured RSSI. If the RSSI is above the smallest connection threshold (the home connection threshold), the connection control unit 122 acquires the scan result from the reception strength determination unit 121.

(S173) The connection control unit 122 determines whether the ESSID included in the scan result is registered in the connection history table 111, namely, determines whether the ESSID is registered as a connection history. If the ESSID is registered, the processing proceeds to step S174. If not, the processing proceeds to step S170.

(S174) The connection control unit 122 determines whether the BSSID included in the scan result is registered in the home AP table 112, namely, determines whether the BSSID is the BSSID of a home access point. If the BSSID is the BSSID of a home access point, the processing proceeds to step S175. If not, the processing proceeds to step S176.

(S175) The connection control unit 122 acquires a home AP connection threshold from the threshold table 113. The connection control unit 122 determines whether the RSSI included in the scan result is above the home AP connection threshold. If the RSSI is above the home AP connection threshold, the processing proceeds to step S179. If not, the processing proceeds to step S170.

(S176) The connection control unit 122 determines whether the BSSID in the scan result is registered in the public AP table 114, namely, determines whether the BSSID is registered as a connection history. If the BSSID is registered as a connection history, the processing proceeds to step S177. If not, the processing proceeds to step S178.

(S177) The connection control unit 122 acquires an individual connection threshold that corresponds to the BSSID included in the scan result from the public AP table 114. Next, the connection control unit 122 determines whether the RSSI included in the scan result is above the acquired individual connection threshold. If the RSSI is above the acquired individual connection threshold, the processing proceeds to step S179. If not, the processing proceeds to step S170.

(S178) The connection control unit 122 acquires a public AP connection threshold from the threshold table 113. The connection control unit 122 determines whether the RSSI included in the scan result is above the public AP connection threshold. If the RSSI is above the public AP connection threshold, the processing proceed to step S179. If not, the processing proceeds to step S170.

(S179) The connection control unit 122 instructs the wireless communication unit 101 to establish connection with the detected access point. Next, the processing proceeds to step S118 in FIG. 12.

The mobile communication system according to the third embodiment provides similar advantageous effects to those provided by the mobile communication system according to the second embodiment. In addition, in the mobile communication system according to the third embodiment, while performing packet communication using a public access point, the mobile communication device 100 measures RSSIs. In addition, the mobile communication device 100 determines an individual connection threshold for the public access point on the basis of the measured RSSIs. In this way, the mobile communication device 100 accurately determines whether to establish connection to a public access point. More specifically, when the user merely passes by a shop having a public access point, the mobile communication device 100 is not connected to the public access point. In contrast, when the user enters the shop, the mobile communication device 100 is connected to the public access point.

As described above, the processing according to the first embodiment is realized by causing the mobile communication device 1 to execute the communication control program. The processing according to the second and third embodiments is realized by causing the mobile communication device 100 to execute the respective communication control programs.

Each of the communication control program may be stored in a computer-readable recording medium. For example, a magnetic disk, an optical disc, a magneto-optical disk, or a semiconductor storage device may be used as the recording medium. Examples of the magnetic disk include a flexible disk (FD) and an HDD. Examples of the optical disc include a compact disc (CD), a CD-R (recordable)/RW (rewritable), a digital versatile disc (DVD), and a DVD-R/RW. Each of the communication control programs may be distributed after being recorded in a portable recording medium. In such case, the program may be executed after being copied from the portable recording medium onto another recording medium (for example, the non-volatile memory 105).

According to one aspect, the possibility of unintended connection to an access point is easily reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mobile communication device comprising:
    a wireless communication interface configured to measure a signal level of a received signal from an access point; and
    a processor configured to perform a procedure including:
    calculating a connection time period during which the mobile communication device has been connected to the access point,
    associating a first signal level threshold with the access point when the connection time period is above a time threshold, and associating a second signal level threshold that is larger than the first signal level threshold with the access point when the connection time period is equal to or less than the time threshold,
    determining, after calculating the connection time period, when the mobile communication device is not connected to the access point, whether to connect the mobile communication device to the access point on the basis of a comparison between the measured signal level and the first signal level threshold or the second signal level threshold associated with the access point, and
    connecting the mobile communication device to the access point when the determining determines to connect to the access point.

2. The mobile communication device according to claim 1,
    wherein the processor calculates an average signal level during connection to the access point and calculates the second signal level threshold on the basis of the average signal level.

3. The mobile communication device according to claim 1,
    wherein, when determining whether to connect the mobile communication device to the access point in accordance with a user operation, the processor compares the measured signal level with the first signal level threshold, regardless of the connection time period.

4. The mobile communication device according to claim 2,
    wherein the average signal level is calculated by using received packets other than beacon packets.

5. A wireless communication method comprising:
    calculating, by a processor included in a mobile communication device, a connection time period during which the mobile communication device has been connected to an access point;
    associating, by the processor, a first signal level threshold with the access point when the connection time period is above a time threshold, and associating a second signal level threshold that is larger than the first signal level threshold with the access point when the connection time period is equal to or less than the time threshold;
    determining, by the processor, after calculating the connection time period, when the mobile communication device is not connected to the access point, whether to connect the mobile communication device to the access point on the basis of a comparison between a measured signal level of a received signal from the access point and the first signal level threshold or the second signal level threshold associated with the access point; and
    connecting the mobile communication device to the access point when the determining determines to connect to the access point.

6. A non-transitory computer-readable recording medium storing a computer program that causes a computer included in a mobile communication device to perform a procedure comprising:
    calculating a connection time period during which the mobile communication device has been connected to an access point;
    associating a first signal level threshold with the access point when the connection time period is above a time threshold, and associating a second signal level threshold that is larger than the first signal level threshold with the access point when the connection time period is equal to or less than the time threshold;
    determining, after calculating the connection time period, when the mobile communication device is not connected to the access point, whether to connect the mobile communication device to the access point on the basis of a comparison between a measured signal level of a received signal from the access point and the first signal level threshold or the second signal level threshold associated with the access point; and
    connecting the mobile communication device to the access point when the determining determines to connect to the access point.

* * * * *